(12) United States Patent
Kim et al.

(10) Patent No.: US 9,967,053 B2
(45) Date of Patent: May 8, 2018

(54) SHORTEST MINIMUM REGENERATION PATH SEARCH IN NETWORKS

(71) Applicant: Fujitsu Limited, Kawasaki-shi, Kanagawa (JP)

(72) Inventors: Inwoong Kim, Allen, TX (US); Xi Wang, Murphy, TX (US); Qiong Zhang, Plano, TX (US); Paparao Palacharla, Richardson, TX (US); Tadashi Ikeuchi, Plano, TX (US)

(73) Assignee: Fujitsu Limited, Kawasaki (JP)

(*) Notice: Subject to any disclaimer, the term of this patent is extended or adjusted under 35 U.S.C. 154(b) by 163 days.

(21) Appl. No.: 15/169,235

(22) Filed: May 31, 2016

(65) Prior Publication Data
US 2017/0346593 A1    Nov. 30, 2017

(51) Int. Cl.
*H04J 14/02*    (2006.01)

(52) U.S. Cl.
CPC ... *H04J 14/0267* (2013.01); *H04J 2203/0023* (2013.01); *H04J 2203/0055* (2013.01); *H04J 2203/0094* (2013.01); *H04J 2203/0098* (2013.01)

(58) Field of Classification Search
None
See application file for complete search history.

(56) References Cited

U.S. PATENT DOCUMENTS

| | | | | |
|---|---|---|---|---|
| 2010/0104281 A1* | 4/2010 | Dhillon | ............... | H04J 14/0227 398/45 |
| 2010/0329120 A1* | 12/2010 | Zhang | ..................... | H04L 45/00 370/238 |
| 2011/0268439 A1* | 11/2011 | Gerstel | ................. | H04L 45/124 398/34 |
| 2013/0286893 A1* | 10/2013 | Zhu | ......................... | H04L 45/64 370/254 |
| 2013/0315580 A1* | 11/2013 | Boertjes | .............. | H04J 14/0204 398/5 |
| 2014/0099119 A1* | 4/2014 | Wei | ...................... | H04J 14/0257 398/79 |
| 2014/0308040 A1* | 10/2014 | Sekiya | ................ | H04J 14/0269 398/79 |
| 2017/0346691 A1* | 11/2017 | Crickett | .................. | H04L 41/12 |

* cited by examiner

*Primary Examiner* — Edan Orgad
*Assistant Examiner* — Saumit Shah
(74) *Attorney, Agent, or Firm* — Baker Botts L.L.P.

(57) ABSTRACT

Methods and systems are provided for determining a shortest minimum regeneration path in an optical network. The method includes creating a virtual node at a source node, the source node communicatively coupled to a destination node through a plurality of nodes and links. The method includes traversing the virtual nodes, wherein traversing the virtual nodes comprises selecting an unvisited virtual node at a node; identifying a candidate virtual node from the unvisited virtual node; determining whether the candidate virtual node exceeds a maximum permitted weight; determining whether the candidate virtual node violates a shortest minimum regeneration path condition; and creating the new virtual node from the candidate virtual node if the candidate virtual node does not exceed the maximum permitted weight and if the candidate virtual node does not violate the shortest minimum regeneration path condition.

20 Claims, 19 Drawing Sheets

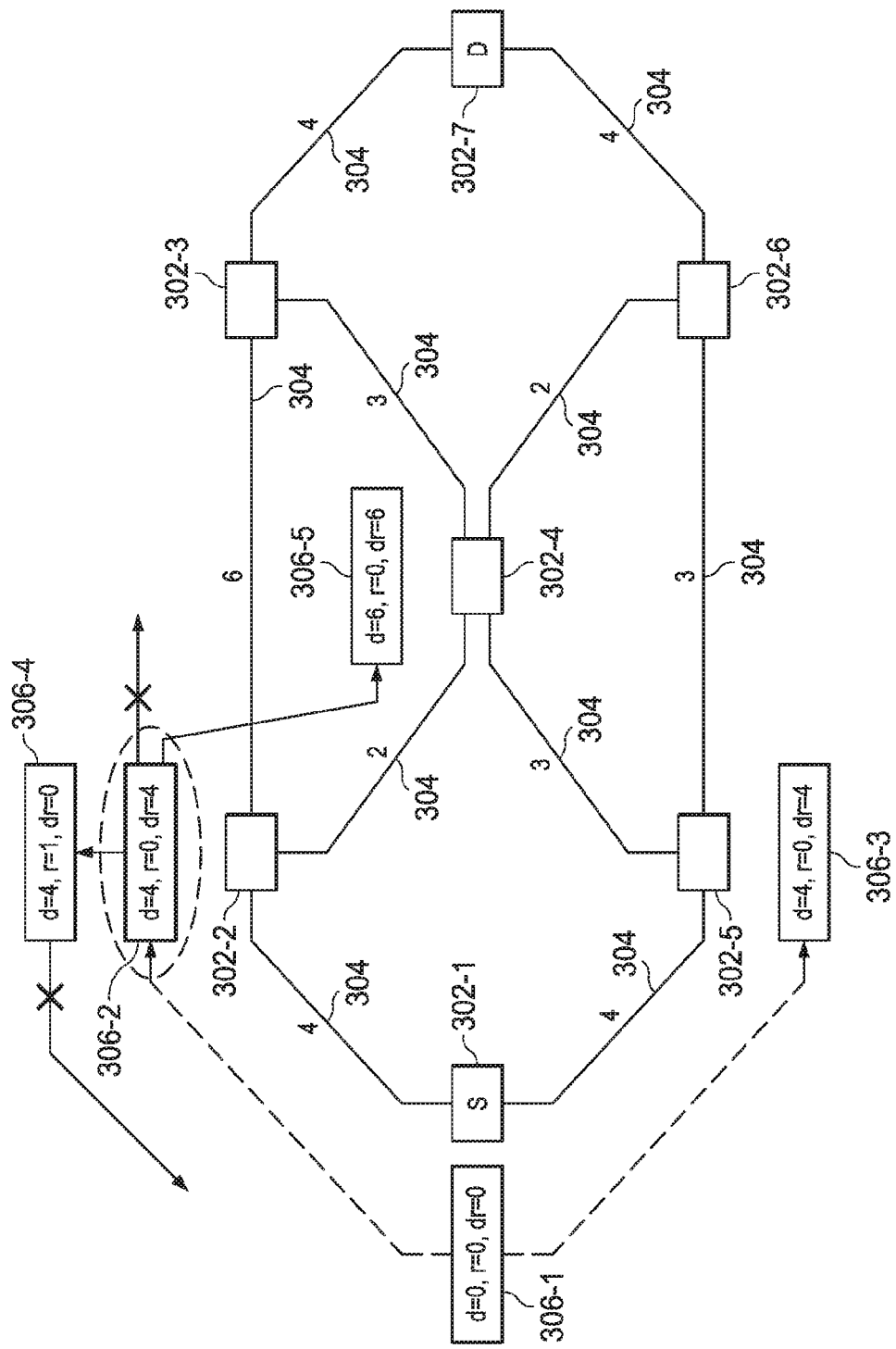

SHORTEST MINIMUM REGENERATION PATH SEARCH IN NETWORKS

BACKGROUND

Field of the Disclosure

The present disclosure relates generally to optical communication networks and, more particularly, to determining the shortest minimum regeneration path in a network.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network elements, such as amplifiers, dispersion compensators, multiplexer/demultiplexer filters, wavelength selective switches, couplers, and other elements configured to perform various operations within the network.

Computation of an optical signal path through the various network nodes is a core function for design, modeling, management, and control of optical networks. Optical path computation may enable operators of an optical network to customize, control, and/or update network policies. One feature of optical path computation involves determination of end-to-end paths from a source node to a destination node. It may be desirable to select the shortest path between the source and destination node to, for example, reduce signal latency or cost. The shortest path may be measured by weights (e.g., distance or another factor) between the nodes.

However, paths in an optical network may vary by factors other than weight. For example, one path between the source and destination node may require one or more optical regenerations which may be more or less than another path with the same cumulative weight. Optical regenerations may affect signal latency, network resources, signal quality, and/or cost within the optical signal path. Thus, it may be desirable to account for optical regenerations in the path computation.

SUMMARY

In particular embodiments, a shortest minimum regeneration path in an optical network includes creating a virtual node at a source node, the source node communicatively coupled to a destination node through a plurality of nodes and links. The method also includes traversing the virtual nodes, wherein traversing the virtual nodes includes selecting an unvisited virtual node at a node; identifying a candidate virtual node from the unvisited virtual node, the candidate virtual node representing a new virtual node at the node and a neighboring node; determining whether the candidate virtual node exceeds a maximum permitted weight; determining whether the candidate virtual node violates a shortest minimum regeneration path condition, the shortest minimum regeneration path condition identifying virtual nodes that could not be part of the shortest minimum regeneration path; creating the new virtual node from the candidate virtual node if the candidate virtual node does not exceed the maximum permitted weight and if the candidate virtual node does not violate the shortest minimum regeneration path condition; and marking the unvisited virtual node as visited. The method also includes identifying a shortest minimum regeneration path between the source node and the destination node from the virtual nodes.

In another embodiment, a control system for identifying the shortest minimum regeneration path, the control system comprising a processor having access to memory media storing instructions executable by the processor to create a virtual node at a source node, the source node communicatively coupled to a destination node through a plurality of nodes and links. The instructions are also executable to select an unvisited virtual node at a node. The instructions are further executable to identify a candidate virtual node from the unvisited virtual node, the candidate virtual node representing a new virtual node at the node and a neighboring node. The instructions are also executable to determine whether the candidate virtual node exceeds a maximum permitted weight. The instructions are further executable to determine whether the candidate virtual node violates a shortest minimum regeneration path condition, the shortest minimum regeneration path condition identifying virtual nodes that could not be part of the shortest minimum regeneration path. The instructions are additionally executable to create the new virtual node from the candidate virtual node if the candidate virtual node does not exceed the maximum permitted weight and if the candidate virtual node does not violate the shortest minimum regeneration path condition. The instructions are also executable to mark the unvisited virtual node as visited. The instructions are further executable to identify a shortest minimum regeneration path between the source node and the destination node from the virtual nodes.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
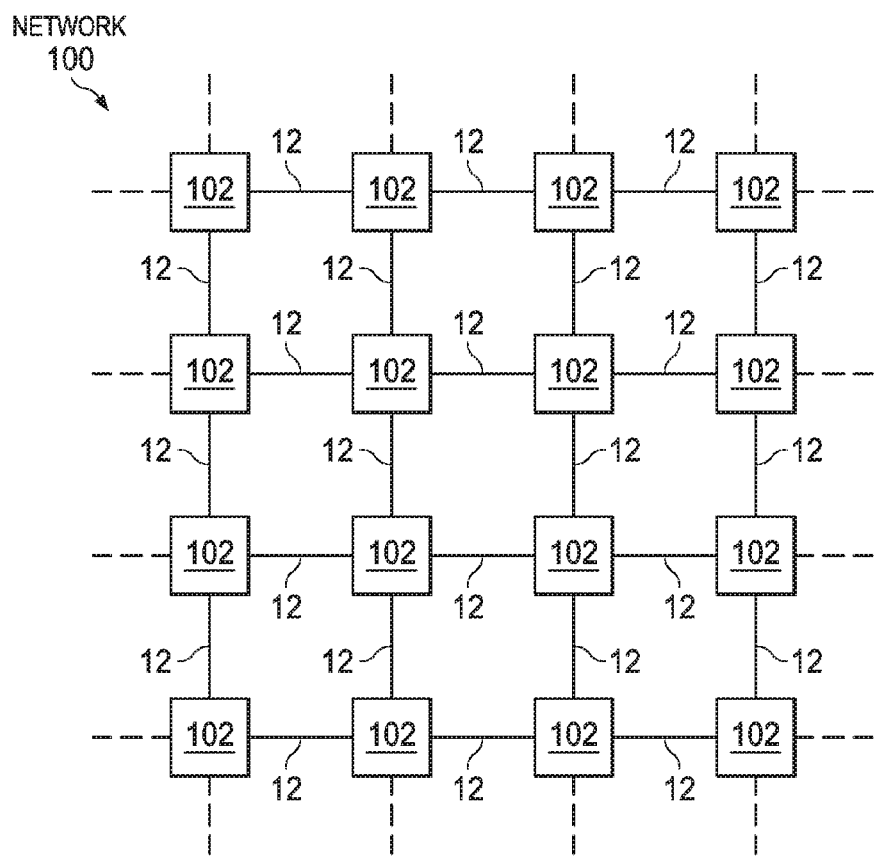
FIG. 1 is a block diagram of selected elements of an embodiment of a network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

A network is comprised of nodes (or network elements) communicatively coupled to each other. These nodes communicate information between each other over links (or transmission media). For example, a source node may send information to a destination node in the network through a path of nodes and links. However, there may be more than one network path by which to send such information. In some embodiments, a path computation engine may be used to identify links between nodes and to select the shortest path between the source and destination nodes. In addition to distance, however, it may be desirable to limit the number of regenerations of an optical signal as it travels in an optical network path to, for example, reduce signal degradation and ensure signal quality. Thus, optical regenerations may be accounted for during path computation to improve signal quality, cost, network resources, or other aspects of the signal, path, or network.

Referring now to the drawings, FIG. 1 is a block diagram showing selected elements of an embodiment of network 100. In various embodiments, network 100 may be an Ethernet network. Network 100 includes one or more transmission media 12 operable to transport one or more signals communicated by components of network 100. The components of network 100, coupled together by transmission media 12, may include a plurality of network elements 102 (also referred to as a network node, or simply a node). In the illustrated network 100, each network element 102 is coupled to four other nodes. However, any suitable configuration of any suitable number of network elements 102 may create network 100. Although network 100 is shown as a mesh network, network 100 may also be configured as a ring network, a point-to-point network, or any other suitable network or combination of networks. Network 100 may be used in a short-haul metropolitan network, a long-haul inter-city network, or any other suitable network or combination of networks.

Each transmission medium 12 may include any system, device, or apparatus configured to communicatively couple network elements 102 to each other and communicate information between them. For example, a transmission medium 12 may include an optical fiber, an Ethernet cable, a T1 cable, a Wi-Fi or Bluetooth connection, and/or any other suitable medium.

Network 100 may communicate information or "traffic" over transmission media 12. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. Traffic may be communicated via any suitable communications protocol, including, without limitation, the Open Systems Interconnection (OSI) standard and Internet Protocol (IP). Additionally, the traffic communicated via network 100 may be structured in any appropriate manner including, but not limited to, frames or packets.

Each network element 102 in network 100 may comprise any suitable system operable to transmit and receive network traffic. For example, network element 102 may be a hub, router, switch, bridge, or any other system or device operable to transmit and receive network traffic. In the illustrated embodiment, each network element 102 may be operable to transmit traffic directly to one or more other network elements 102 and receive traffic directly from one or more other network elements 102 via transmission media 12.

As referenced above, one or more components of network 100 may be optical network components. For example, some or all of network elements 102 may communicate via optical signals. Thus, some network elements 102 may include one or more optical transmitters, multiplexers, optical amplifiers, add/drop multiplexers, demultiplexers, and optical receivers. Optical network elements 102 may communicate over optical fibers that include thin strands of glass capable of communicating the signals over long distances with very low loss. These optical fibers may comprise a suitable type of fiber, including for example, Single-Mode Fiber (SMF), Enhanced Large Effective Area Fiber (E-LEAF), or True-Wave® Reduced Slope (TW-RS) fiber.

The optical elements in network 100 may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave or a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

Network 100 may include a management plane, a control plane, and a transport plane (sometimes called the physical layer). A central management host (not expressly shown in FIG. 1) may reside in the management plane and may configure and supervise the components of the control plane. The management plane may control transport plane and control plane entities (e.g., network elements 102 and network nodes 302 discussed below with respect to FIG. 3). As an example, the management plane may consist of a central processing center (e.g., the central management host), including one or more processing resources, data storage components, etc. The management plane may be communication with the elements of the control plane and may also be in communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and/or an operational support system (OSS) which handles network-wide operations.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

Figure 2:
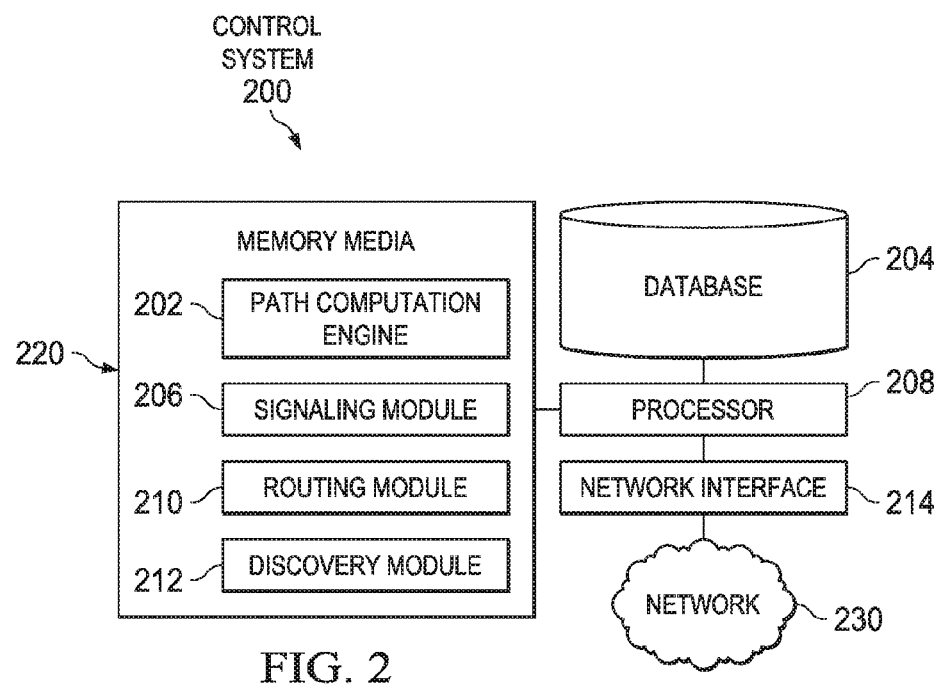
FIG. 2 is a block diagram of selected elements of an embodiment of a control system for an optical network.

FIG. 2 is a block diagram of selected elements of an embodiment of control system 200 for implementing control plane functionality in networks, such as, for example, in network 100 in FIG. 1 or network 300 in FIG. 3. An exemplary control system is Fujitsu Network Communications Inc.'s NETSMART® system. A control plane may include functionality for network intelligence and control and may comprise applications that support the ability to establish network services, including applications or modules for discovery, routing, path computation, and signaling, as will be described in further detail below. The control plane applications executed by control system 200 may work together to automatically establish services within the network, including for example, within the optical components of the network. Discovery module 212 may discover physical links connecting nodes (i.e., network elements) to neighbor nodes. Routing module 210 may broadcast physical link (e.g., transmission medium) information to network nodes while populating database 204. When a request for service from the network is received, path computation engine 202 may be called to compute a network path using database 204. This network path may then be provided to signaling module 206 to establish the requested service.

As shown in FIG. 2, control system 200 includes processor 208 and memory media 220, which may store executable instructions (i.e., executable code) that may be executable by processor 208, which has access to memory media 220. Processor 208 may execute instructions that cause control system 200 to perform the functions and operations described herein. For the purposes of this disclosure, memory media 220 may include non-transitory computer-readable media that stores data and instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210. As described herein, path computation engine 202, in conjunction with signaling module 206, discovery module 212, and routing module 210, may represent instructions or code for implementing various algorithms according to the present disclosure.

Also shown included with control system 200 in FIG. 2 is network interface 214, which may be a suitable system, apparatus, or device operable to serve as an interface between processor 208 and network 230. Network interface 214 may enable control system 200 to communicate over network 230 using a suitable transmission protocol or standard. In some embodiments, network interface 214 may be communicatively coupled via network 230 to a network storage resource. In some embodiments, network 230 may be an embodiment of at least certain portions of network 100. Network 230 may be implemented using hardware, software, or various combinations thereof.

In certain embodiments, control system 200 may be configured to interface with a person (i.e., a user) and receive data about the optical signal transmission path. For example, control system 200 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 200 may be configured to receive data about the optical signal transmission path from a device such as another computing device or a network element, for example via network 230.

In some embodiments, discovery module 212 may be configured to receive data concerning an optical signal transmission path in an network and may be responsible for discovery of neighbor nodes and links between these nodes. In other words, discovery module 212 may send discovery messages according to a discovery protocol, and may receive data about the optical signal transmission path. In some embodiments, discovery module 212 may determine features of the nodes, links, number and type of components, data rate, and/or signal information (e.g., modulation format of the data, input power of the signal, number of signal carrying wavelengths, channel spacing, traffic demand, and network topology, among others).

Routing module 210 may be responsible for propagating link connectivity information to various nodes within a network, such as network 100 or network 300 discussed with respect to FIG. 3. In particular embodiments, routing module 210 may populate database 204 with resource information to support traffic engineering, which may include link bandwidth availability. Accordingly, database 204 may be populated by routing module 210 with information usable to determine a network topology of a network.

Path computation engine 202 may use the information provided by routing module 210 to database 204 to determine transmission characteristics of the optical signal transmission path, including the optical signal transmission path in the optical portions of the network. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 202 may consider the interplay between the transmission degradation factors. In various embodiments, path computation engine 202 may generate values for specific transmission degradation factors. Path computation engine 202 may further store data describing the optical signal transmission path in database 204.

In FIG. 2, signaling module 206 may provide functionality associated with setting up, modifying, and tearing down end-to-end networks services in an optical network, such as network 100 of FIG. 1 or network 300 of FIG. 3. For example, when an ingress node in the network receives a service request, control system 200 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

In operation of control system 200, a feature of optical path computation may include the calculation of end-to-end reachable paths. A directly reachable path may represent a path between a source node and a destination node in a network for which an optical signal between the source node and the destination node may be transmitted without regeneration. By contrast, an indirectly reachable path between the source node and the destination node may involve regenerating the optical signal, using optical-electrical-optical (O-E-O), all-optical, or other suitable regenerators, before reaching the destination. Regeneration may be performed by a network node capable of regeneration. The number of regenerations required in a signal path may depend on the signal strength, transmission distance, network nodes in the path, physical links, and/or a combination thereof.

Path computation engine 202 may determine the shortest end-to-end reachable paths. For example, path computation engine 202 may select the path from a source node to a destination node with the minimum combined weight between network nodes. Each physical link coupling network nodes may have a weight representing one or more factors, including distance, cost, delay, noise, transmission characteristics, and/or a combination thereof. Path computation engine 202 may use a shortest path algorithm to determine the shortest path between any two nodes. Examples of shortest path algorithms include but are not limited to Dijkstra's algorithm, the Bellman-Ford algorithm, Gabow's algorithm, and Thorup's algorithm.

However, as stated above, there may be factors other than weights of physical links that affect performance of an optical path or the network in which the path is located. For example, each path may traverse a number of network nodes, a number of a particular type of node, or a number of a particular type of physical links to reach the destination node. One or more of these factors may contribute to when and whether optical signal regeneration is performed in the signal path. Optical signal regeneration may affect signal quality, cost, network resources, or other aspects of the optical path or network such that it may be desirable to select the shortest path with the fewest regenerations, referred to herein as the shortest minimum regeneration path. Path computation engine 202 may account for optical regenerations in computing the shortest path between a source and destination node.

Figure 3A:
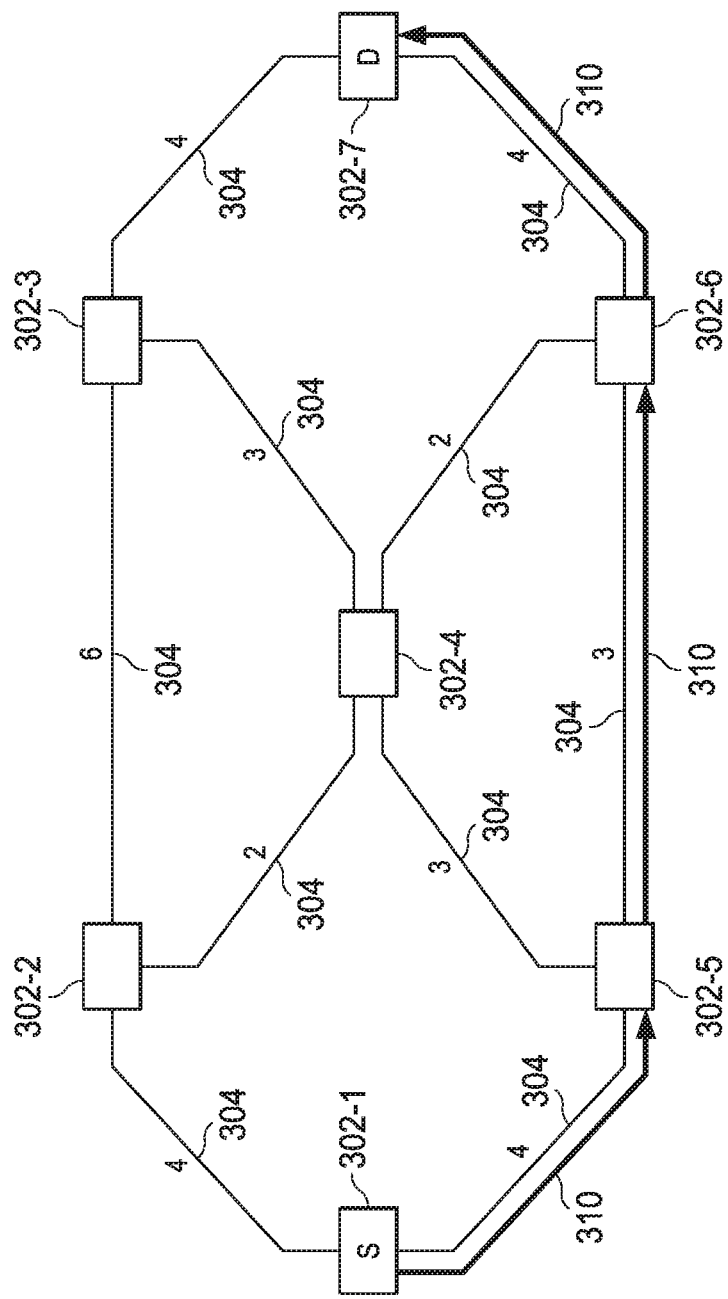
FIGS. 3A-3Q are block diagrams of selected elements of an embodiment of an optical network at various stages of shortest minimum regeneration path computation.
Figure 3B:
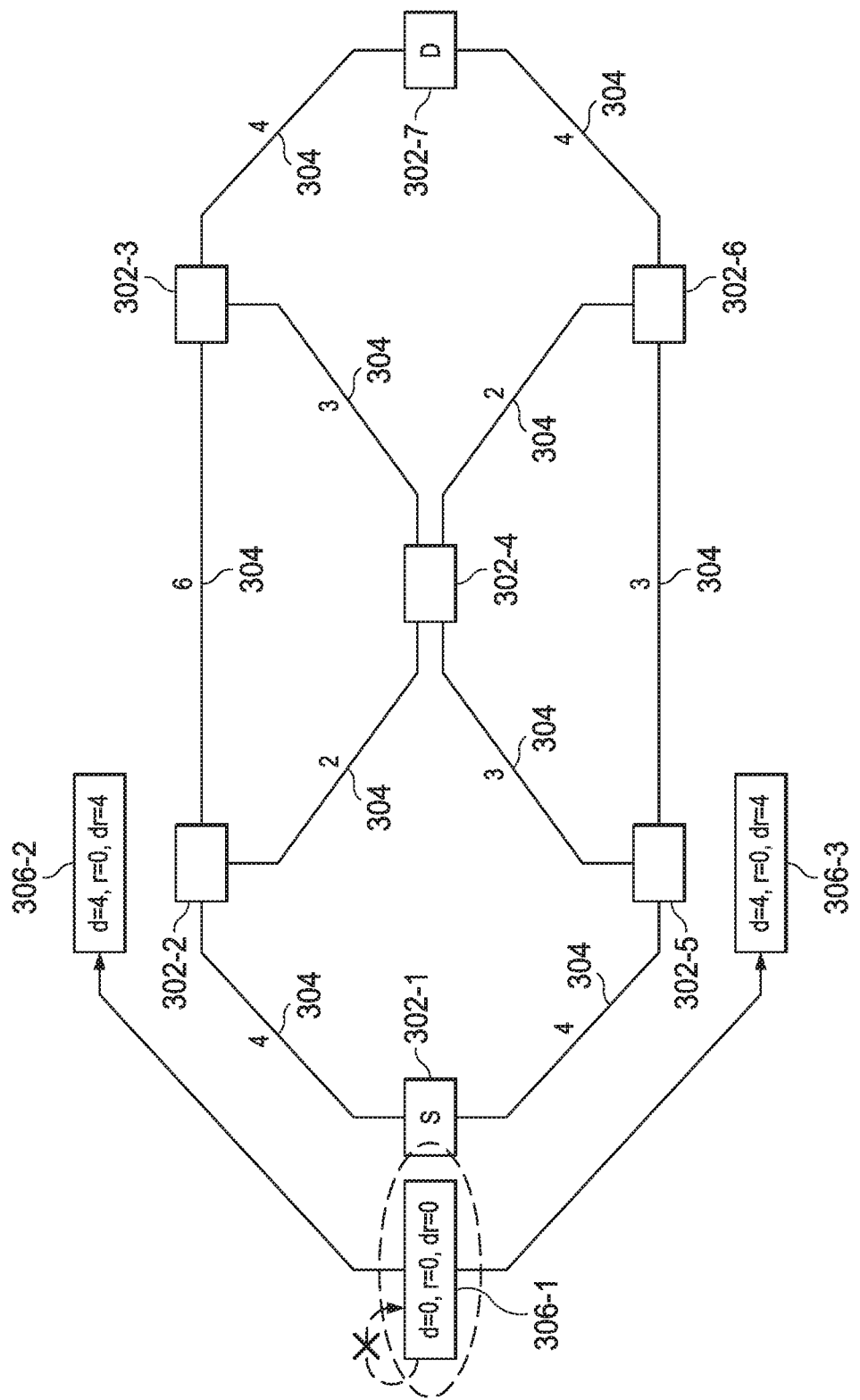
Figure 3D:
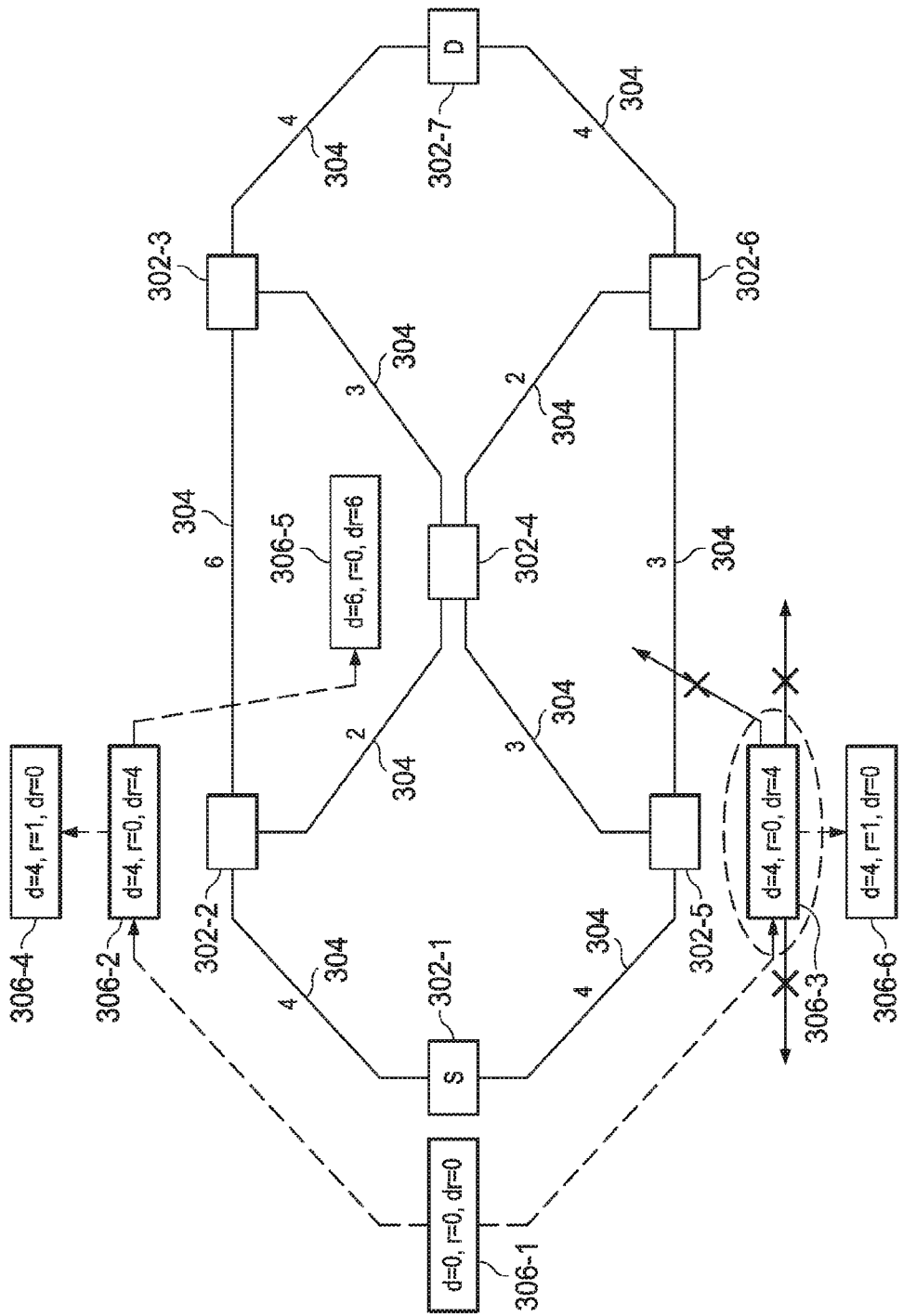
Figure 3E:
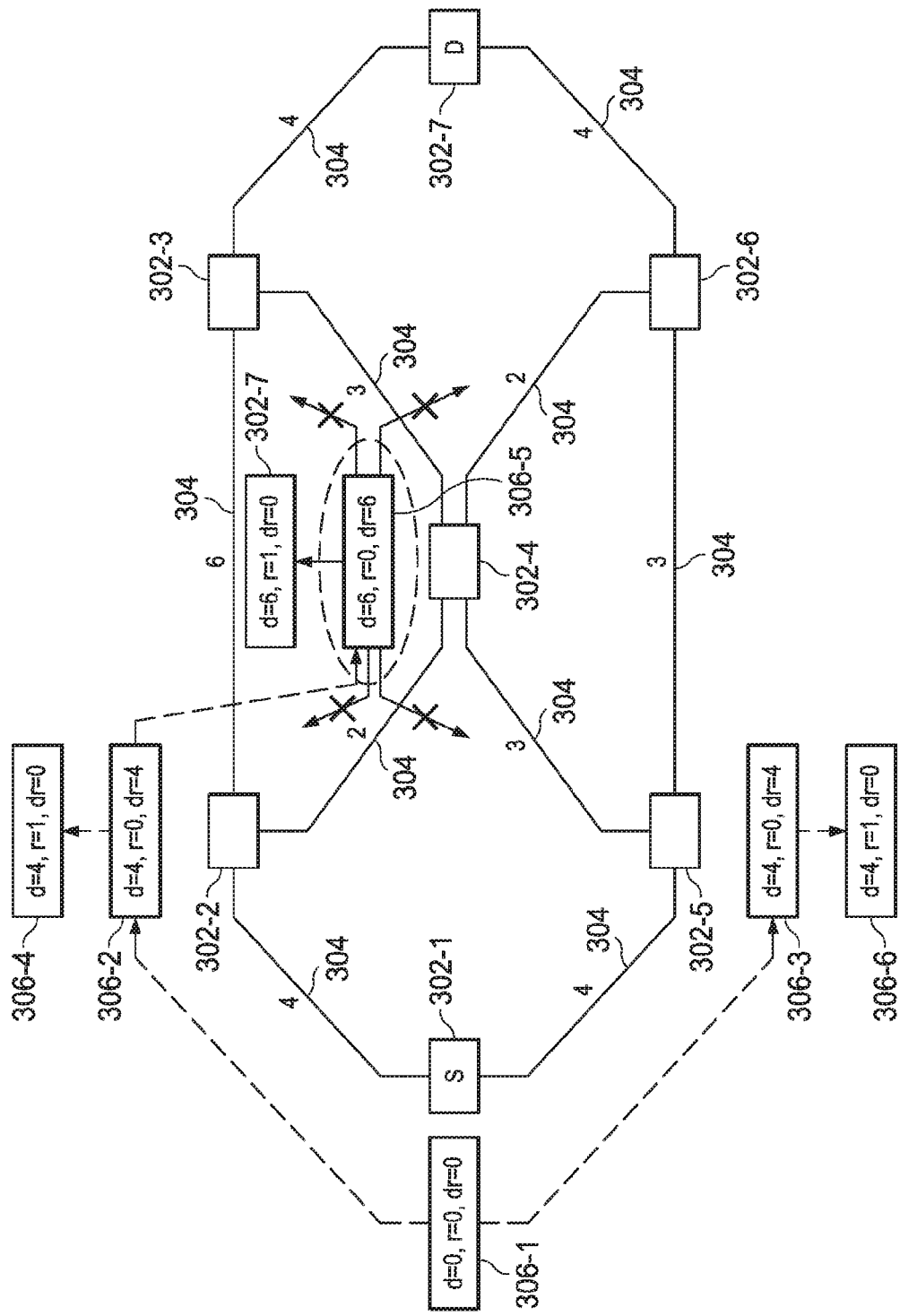
Figure 3F:
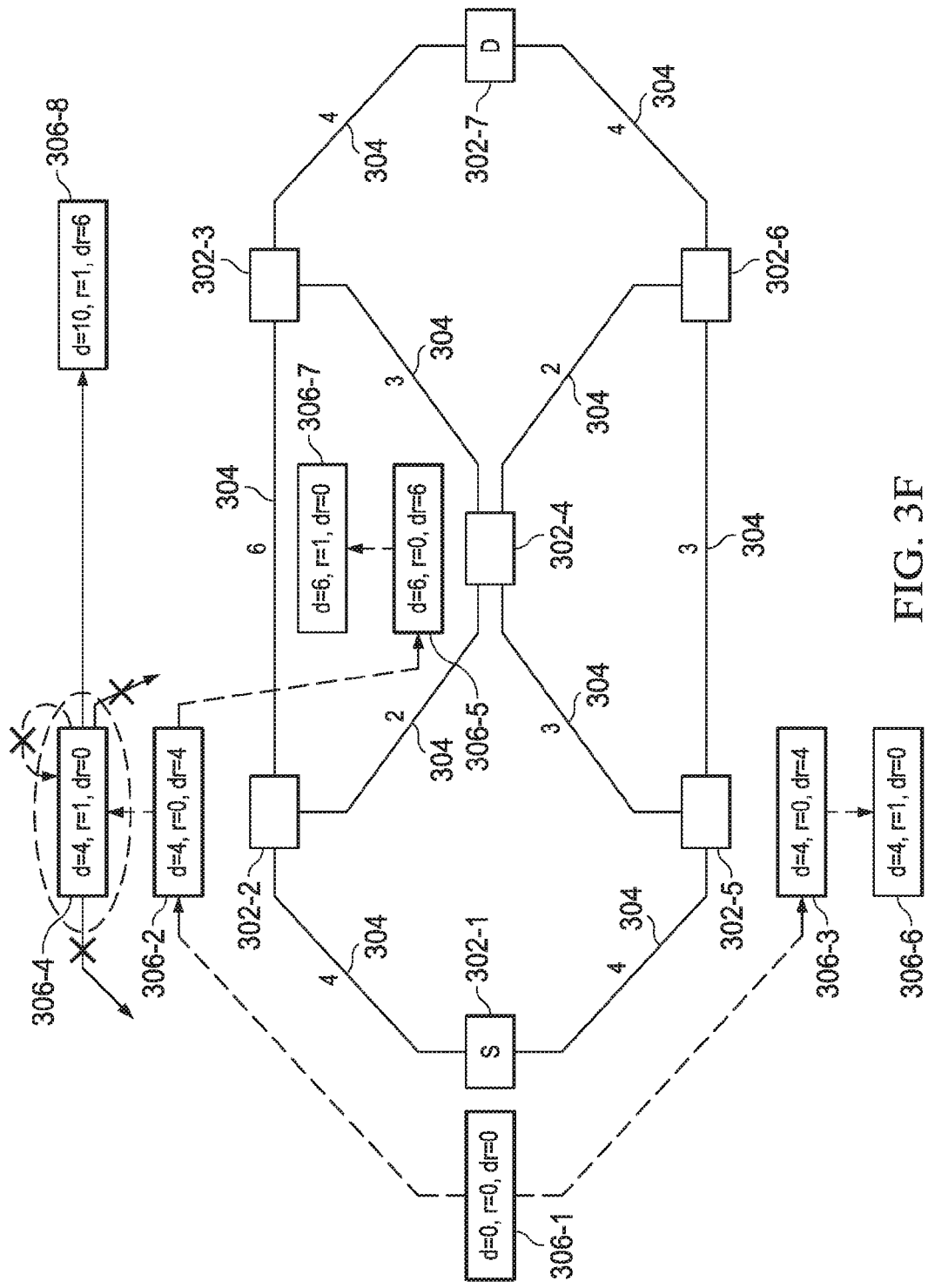
Figure 3G:
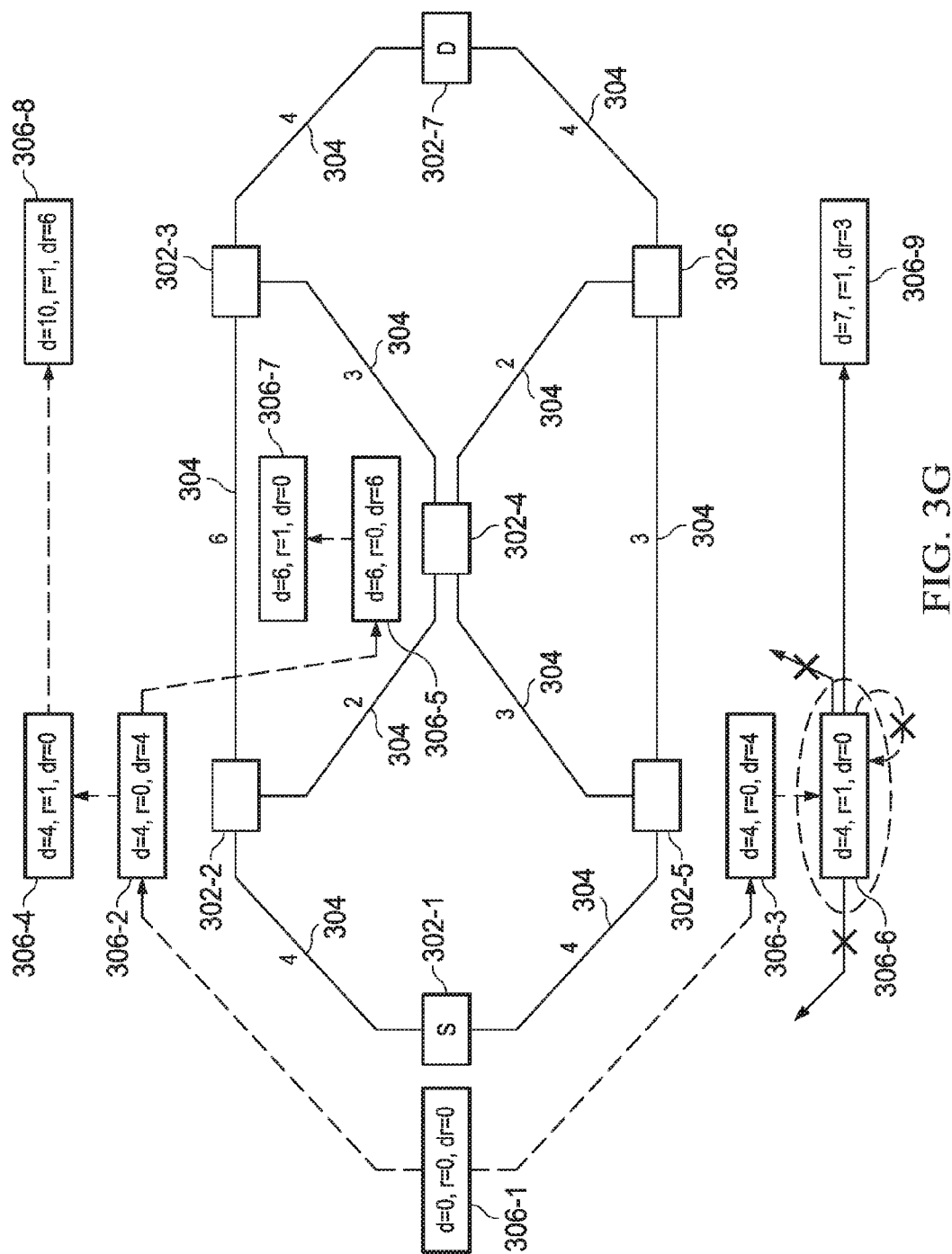
Figure 3H:
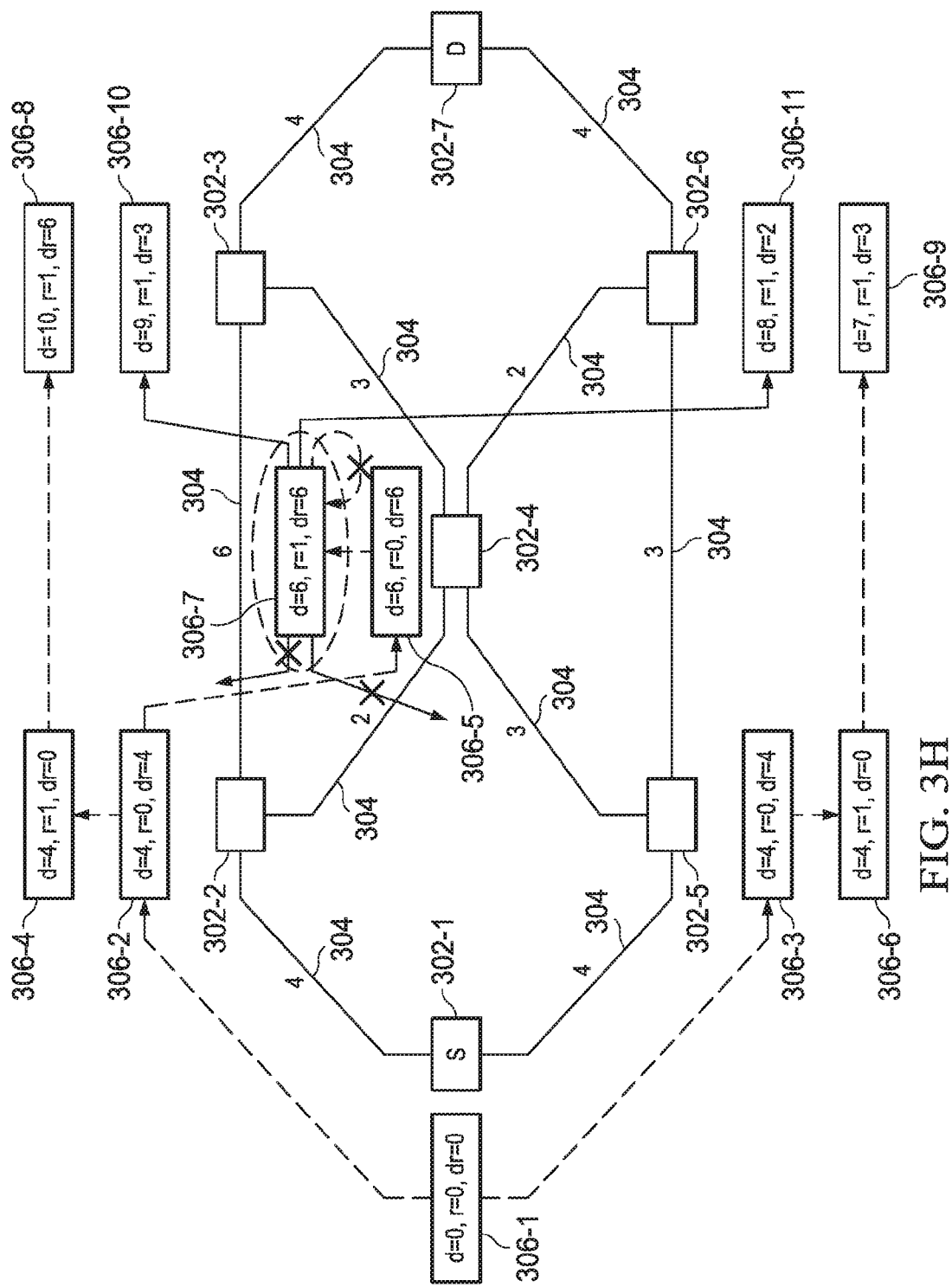
Figure 3I:
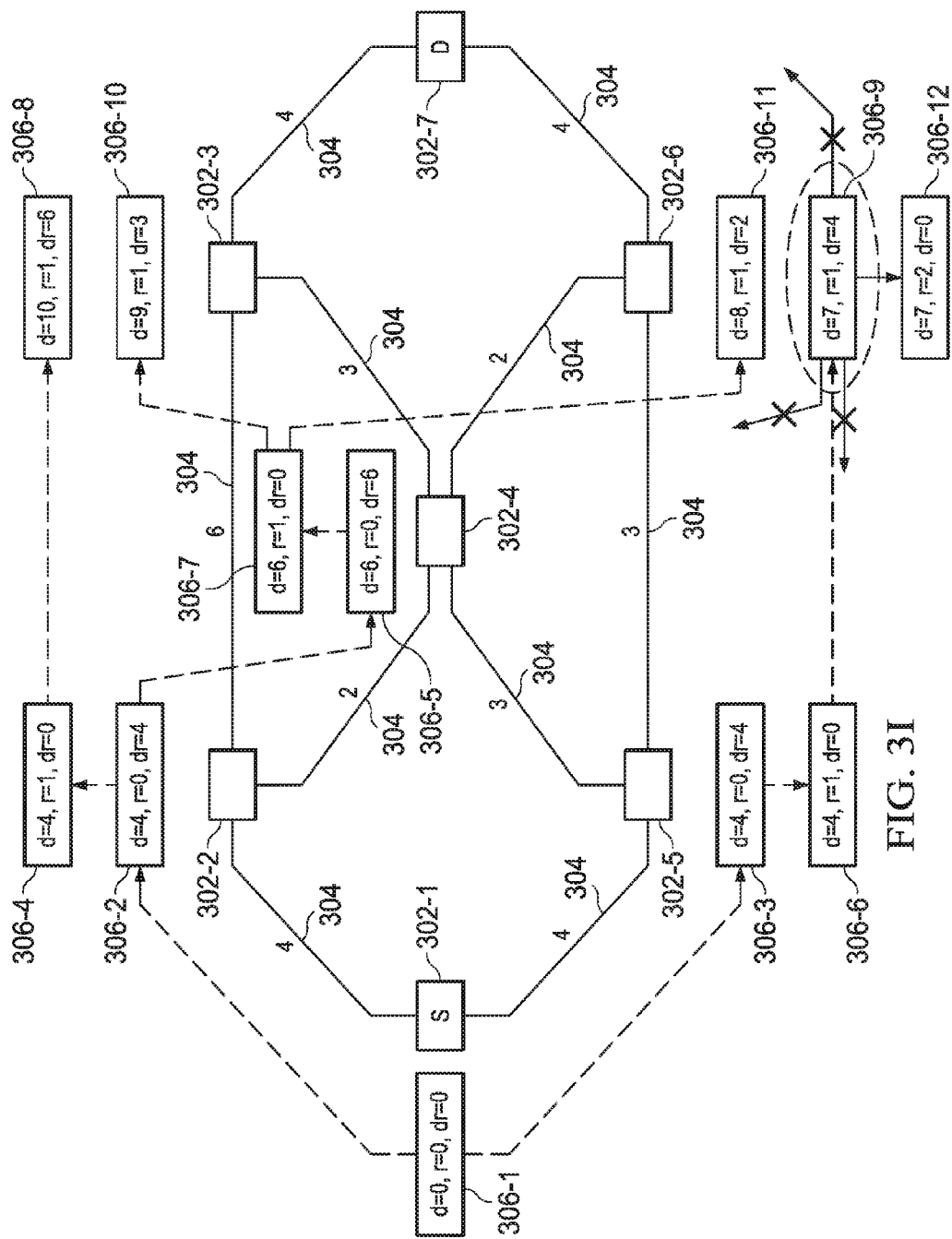
Figure 3J:
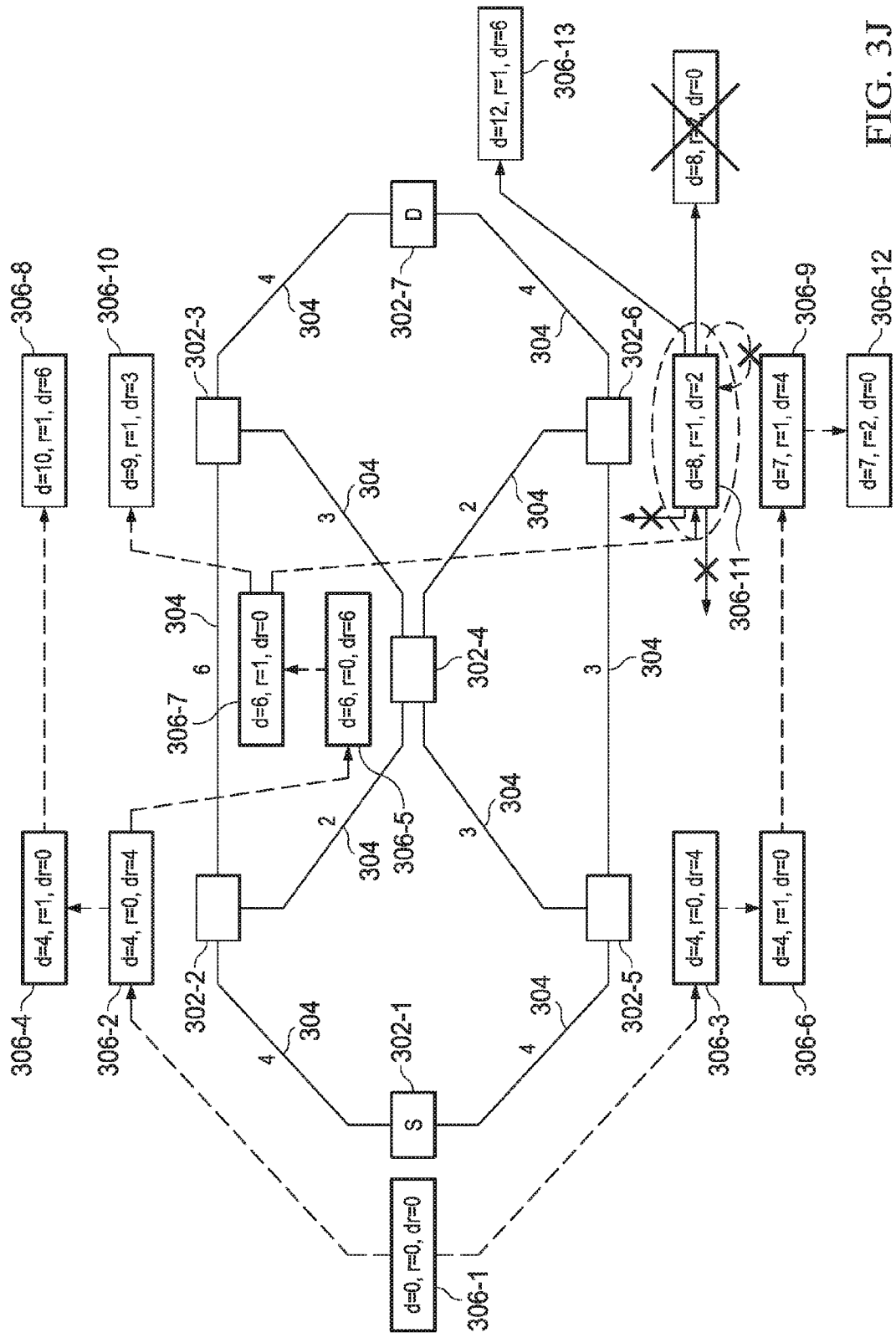
Figure 3K:
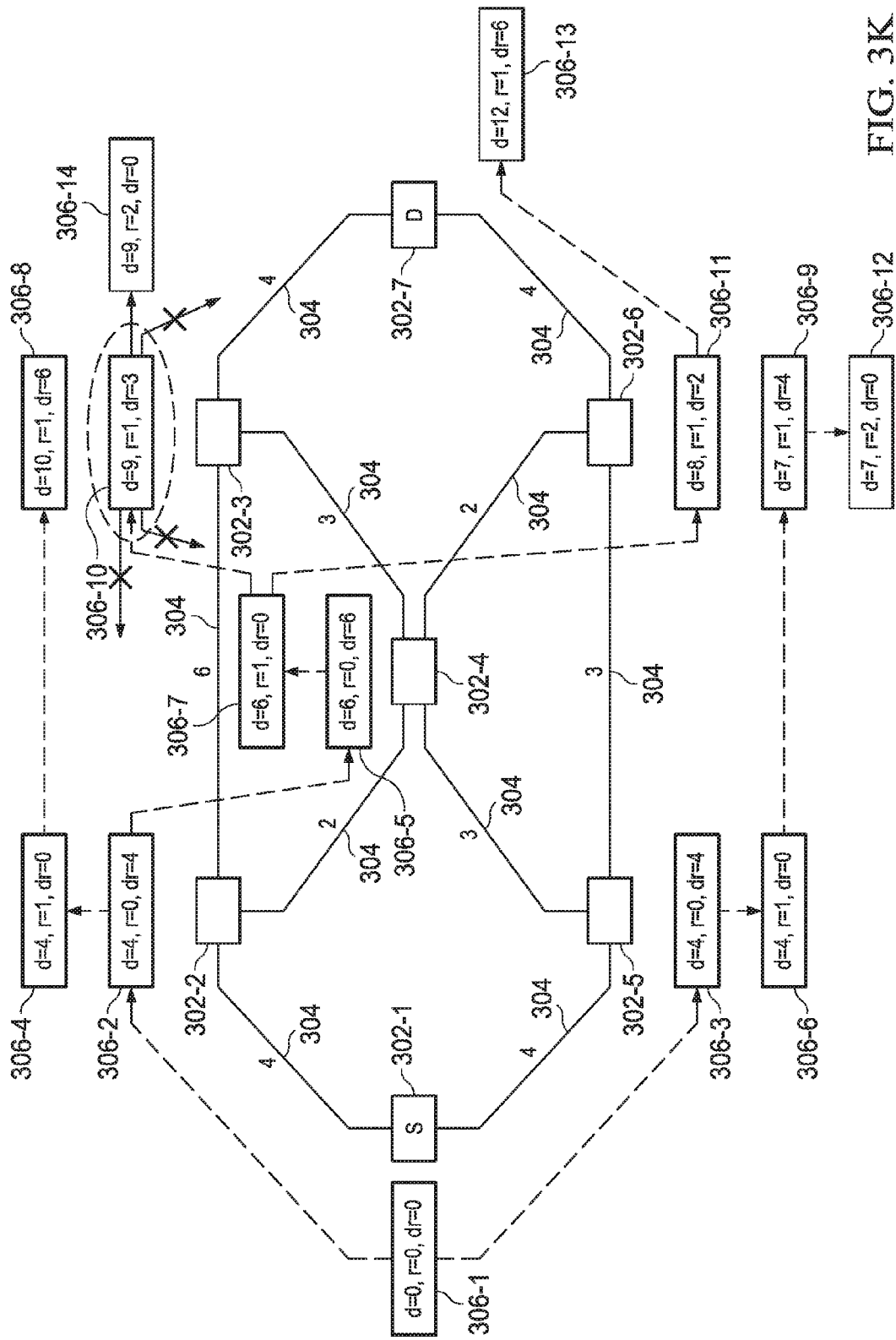
Figure 3L:
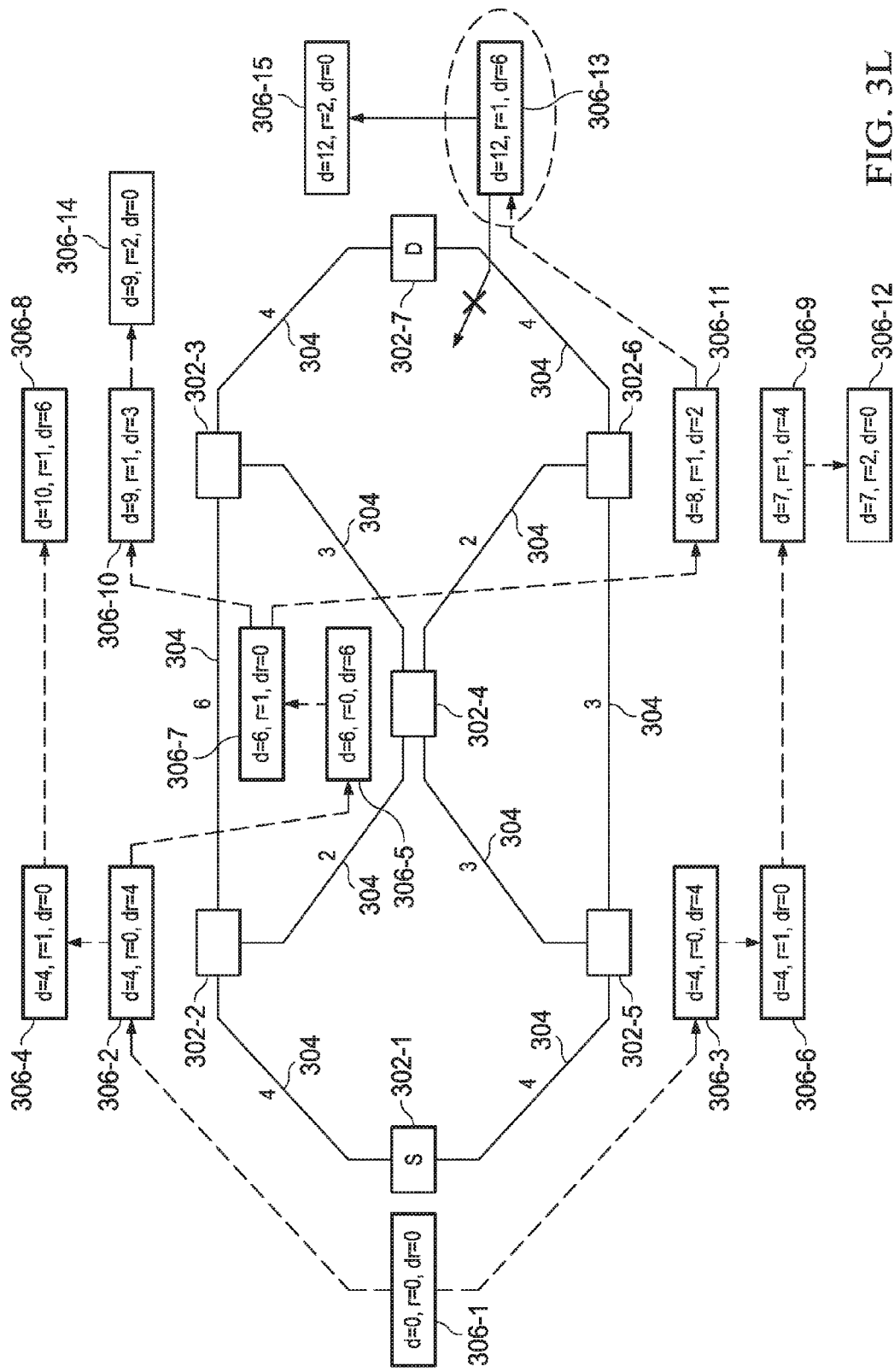
Figure 3M:
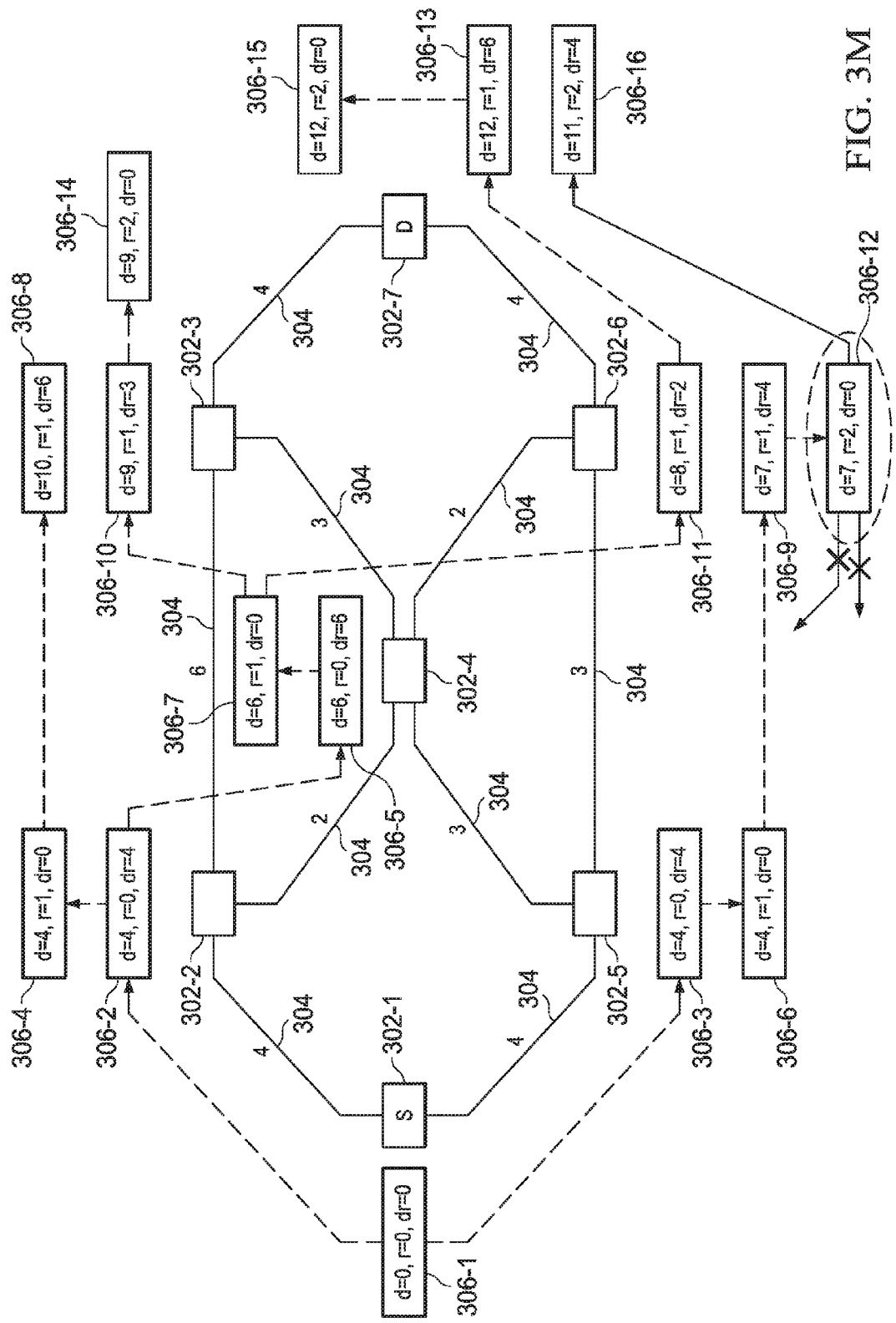
Figure 3N:
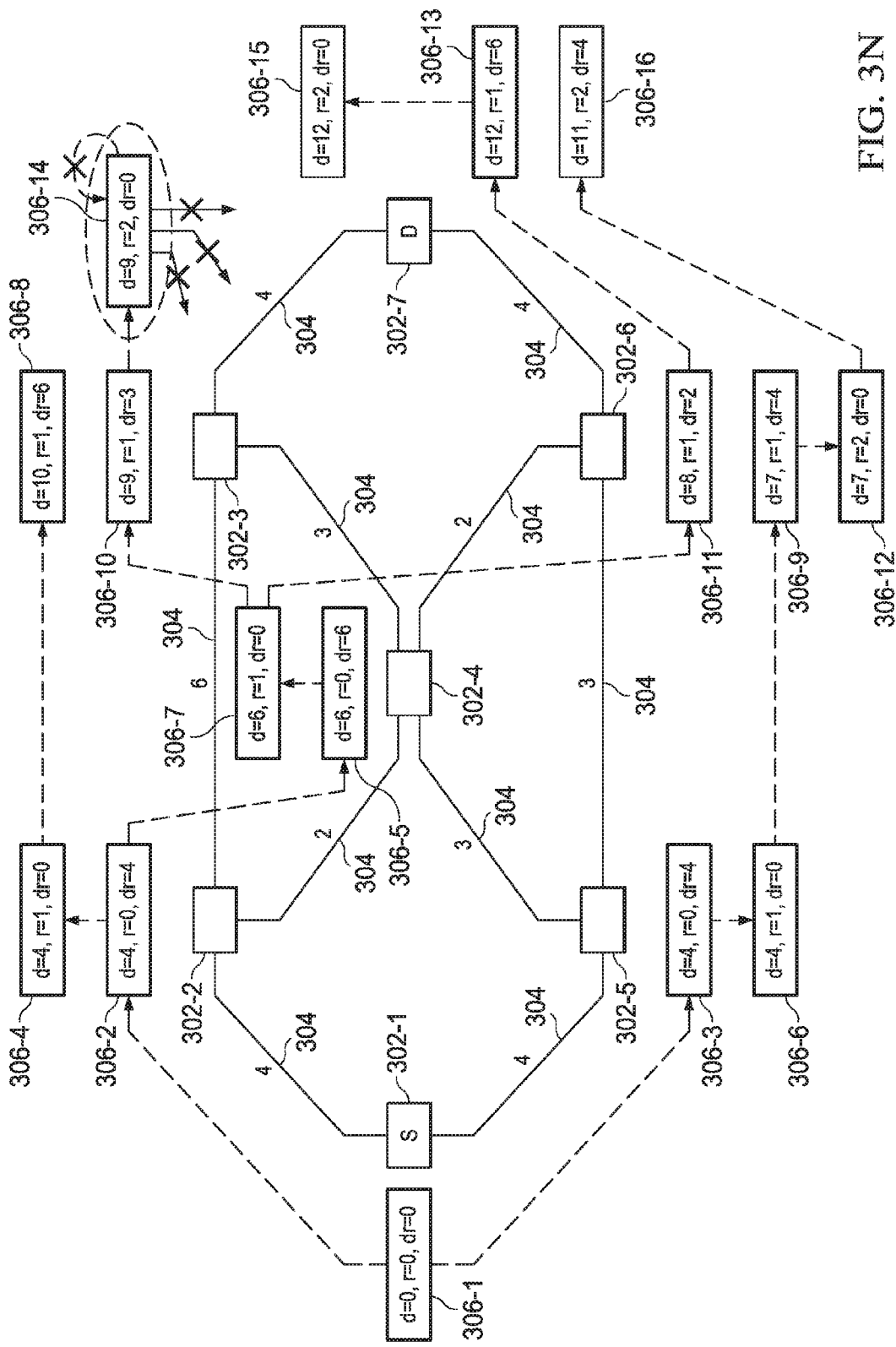
Figure 3O:
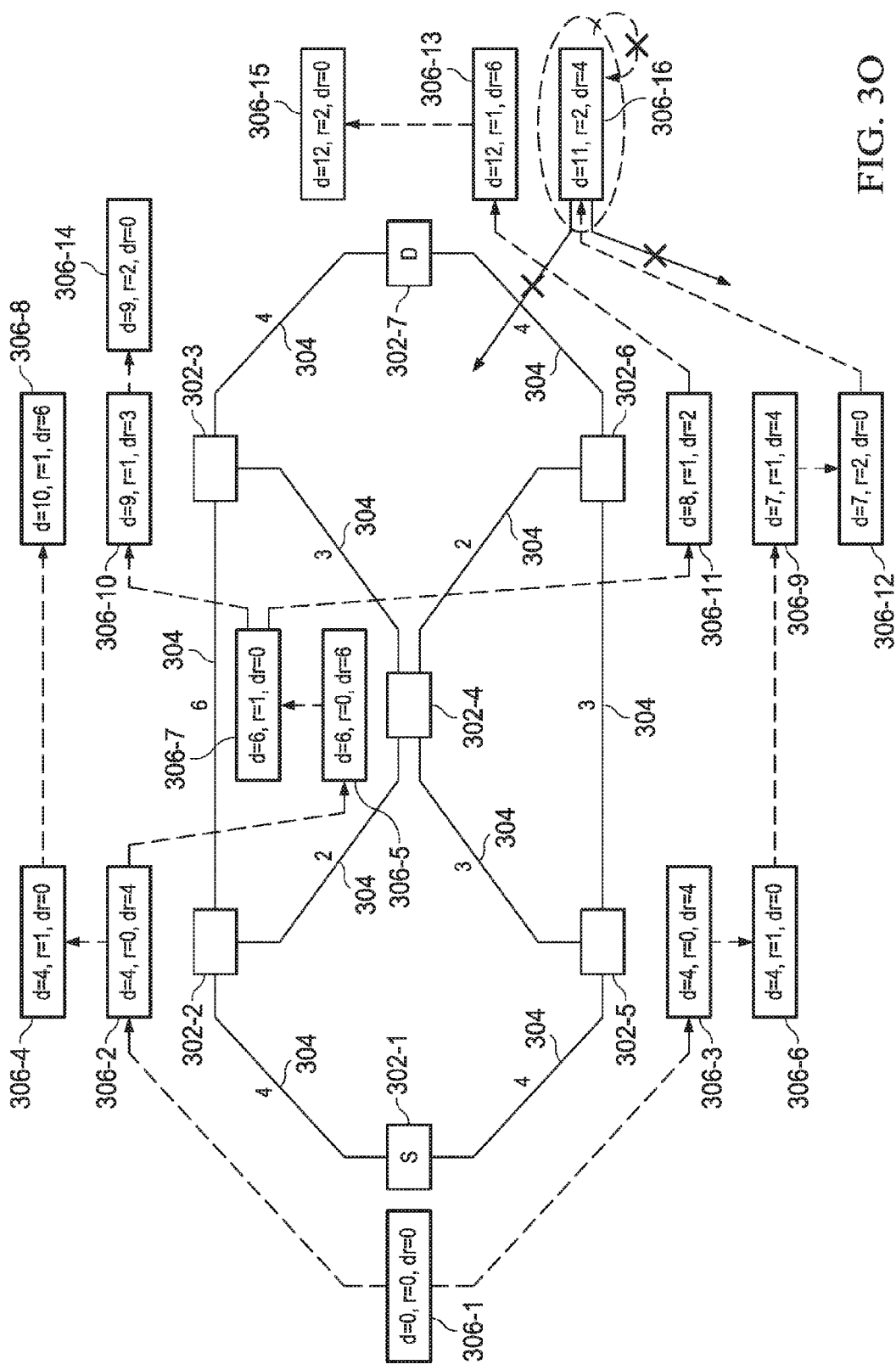
Figure 3P:
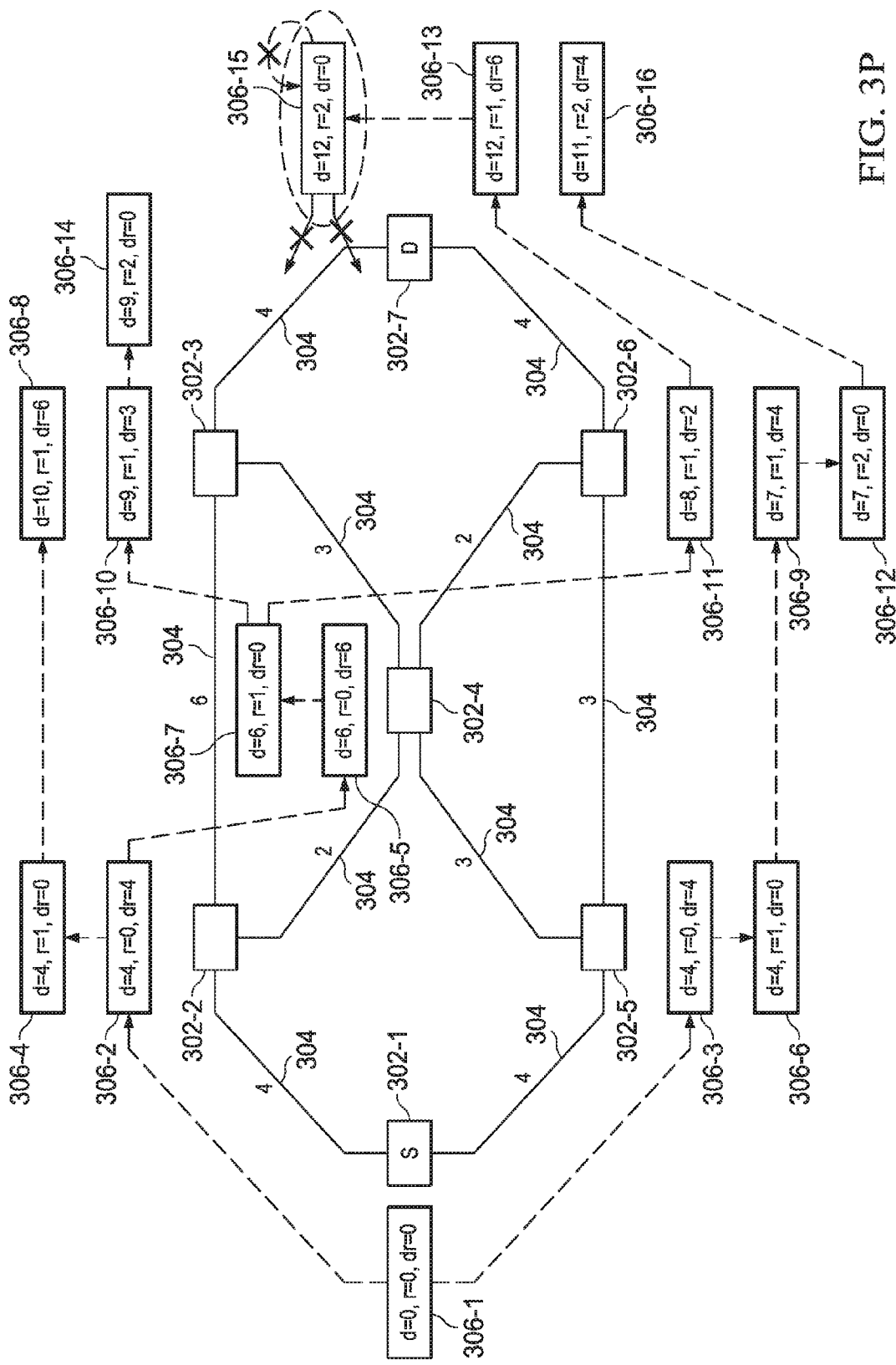
Figure 3Q:
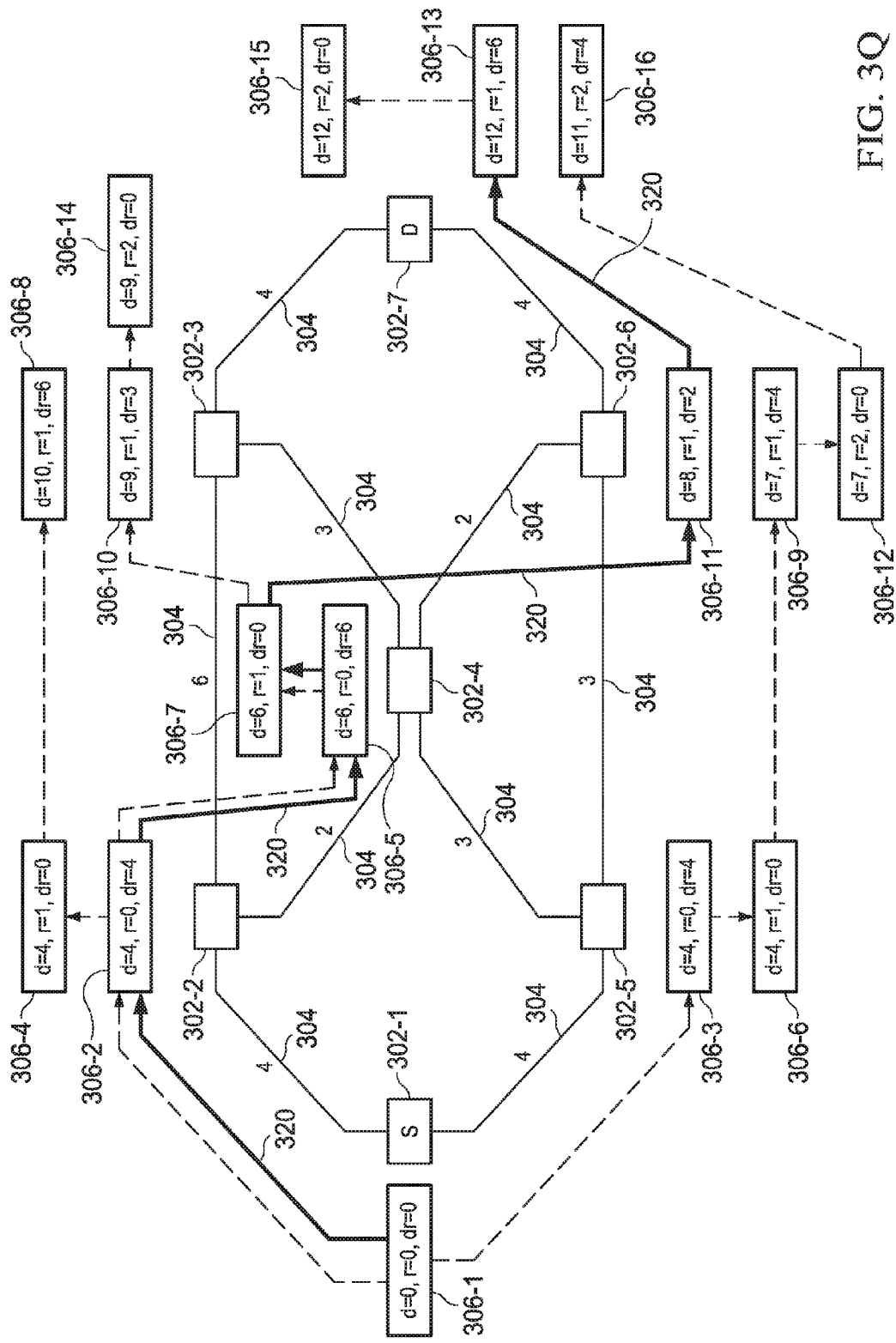

FIGS. 3A-3Q are block diagrams of selected elements of an embodiment of an optical network at various stages of shortest minimum regeneration path computation.

As shown, network 300 includes nodes 302-1 through 302-7, collectively referred to as nodes 302. During operation, a particular node 302 may communicate messages with other nodes 302 and/or other components of optical network 300 by optical signals propagating on physical links 304 at an appropriate wavelength. The optical signals may use or contain any of the techniques discussed above with respect to FIG. 1, including for example, modulation or multiplexing. Nodes 302 may communicate both data (e.g., files or webpages) and signaling (e.g., control messages, routing messages, and link management messages) using physical links 304. Data and signaling may be referred to collectively as messages or traffic.

Nodes 302 may include any suitable system operable to transmit and receive messages. For example, nodes 302 may include an OADM, a cross connect, a regenerating unit, an access gateway, an endpoint, a softswitch server, a trunk gateway, an access service provider, an Internet service provider, hub, router, switch, bridge, or any other device operable to route data to, from or within network 300.

Physical links 304 may include any suitable medium for transporting communications between nodes 302. For example, physical links 304 may comprise an optical fiber, such as those discussed above with respect to transmission medium 12 in FIG. 1.

Assume that node 302-1 needs to send a message to node 302-7. In such a scenario, node 302-1 is the source node and node 302-7 is the destination node for this particular transmission. As illustrated by the exemplary network topology in FIG. 3, more than one path may be used to route the message from the source node to the destination node. Possible paths include between nodes 302-1→302-2→302-3→302-7, between nodes 302-1→302-2→302-4→302-3→302-7, between nodes 302-1→302-2→302-4→302-6→302-7, between nodes 302-1→302-5→302-6→302-7, and between nodes 302-1→302-5→302-4→302-6→302-7, and between nodes 302-1→302-5→302-4→302-3→302-7.

To select the appropriate path from node 302-1 to node 302-4, network 300 may contain or communicably couple to a system for path identification and/or selection. For example, network 300 may include a control system, similar to that described above with respect to FIG. 2. The control system may analyze and select end-to-end paths between various nodes 302 of network 300 using a discovery module, routing module, signaling module, and/or path computation engine.

One consideration in selecting the path may be the weights associated with physical links 304 coupling nodes 302. In network 300, each physical link 304 has an assigned weight. The weight may represent distance, delay, noise, and/or a combination thereof for the particular link. For example, the link coupling nodes 302-1 and 302-2 has a weight of 4, the link coupling nodes 302-2 to 302-3 has a weight of 6; the link coupling nodes 302-3 to 302-4 has a weight of 3, the link coupling nodes 302-3 to 302-7 has a weight of 4, the link coupling nodes 302-1 to 302-5 has a weight of 4, the link coupling nodes 302-5 to 302-6 has a weight of 3, the link coupling nodes 302-5 to 302-4 has a weight of 3, the link coupling nodes 302-4 to 302-6 has a weight of 2, the link coupling nodes 302-6 to 302-7 has a weight of 4.

Network 300 may use a shortest path algorithm, including those enumerated above, to identify the shortest path between nodes 302 using the weights of physical links 304 in network 300. The shortest path may represent the path with the lowest combined weight of physical links 304 in the path. For example, the shortest path from source node 302-1 to destination node 302-7 is between nodes 302-1→302-5→302-6→302-7 (illustrated by shortest path 310), representing a combined weight of 11 (e.g., 4+3+4).

As an optical signal travels within network 300, the signal may degrade because of attenuation, noise accumulation, and/or distortion. A degraded signal may reduce the signal-to-noise ratio. To maintain signal quality and network reliability, a network may include a maximum permitted weight that an optical signal may travel before it is regenerated. The maximum permitted weight a signal may travel before regeneration may be affected by the elements within the network, environmental effects on the network, network utilization, and/or other characteristics of the network.

Network 300 may use regeneration to extend the travel distance of an optical signal. For example, one or more nodes 302 may include hardware and/or software to regenerate an optical signal such that the signal may continue to travel toward its destination with reduced latency and/or degradation. Signal regeneration may require optical-electrical-optical or another form of regeneration to increase the strength and travel distance of the signal. While signal regeneration may extend the travel distance of an optical signal, regeneration may adversely affect latency, resources, signal quality, and/or cost within the optical signal path. Thus, it may be desirable to select and use the shortest minimum regeneration path in a network representing the shortest path with the fewest regenerations.

As an example only, an optical signal in network 300 may travel on one or more physical links 304 up to a maximum permitted weight of 6 before requiring regeneration. That is, the optical signal may require regeneration when the combined weights of physical links 304 traveled by the signal exceeds the maximum permitted weight. A signal traveling on shortest path 310 (e.g., the path between nodes 302-1→302-5→302-6→302-7) may require two regenerations, the first at node 302-5 because traveling from nodes 302-1→302-5→302-6 passes through links with a combined weight of 7 (e.g., 4+3), exceeding the maximum permitted weight of 6. Assuming that the signal is regenerated at node 302-5, the signal may again require regeneration at node 302-6 because traveling between nodes 302-5→302-6→302-7 passes through links having a combined weight of 7 (e.g., 3+4), exceeding the maximum permitted weight. Thus, shortest path 310 may represent the shortest path between source node 302-1 and destination node 302-7, but a signal traveling on shortest path 310 may require two regenerations.

Network 300 may use one or more virtual nodes to account for regenerations in the shortest path computation to identify the shortest minimum regeneration path. FIG. 3B is a block diagram of selected elements of an embodiment of network 300 with virtual nodes. One or more virtual nodes 306 may be added to each node 302. A virtual node may correspond with a candidate path within network 300. As virtual nodes 306 are traversed using the physical links, additional virtual nodes 306 may be added to network 300. The shortest path algorithm may traverse the virtual nodes to calculate the shortest path with the fewest regenerations.

A virtual node 306 may link to another virtual node 306 in the network. In computing the shortest path, any virtual link formed between two virtual nodes has a weight equivalent to the particular physical link 304 coupling the corresponding nodes 302. For example, a virtual link between a virtual node of node 302-1 and a virtual node of node 302-2 has the same weight as physical link 304 (i.e., 4) coupling these two nodes. Each virtual node 306 may include values related to the shortest regeneration path computation. For example, virtual nodes 306 may have a distance value ("d" in FIGS. 3B-3Q) that represents the combined weight of physical link(s) 304 in the path to the virtual node. Virtual nodes 306 may also include a regeneration value ("r" in FIGS. 3B-3Q) that represents the number of regenerations in the path to the virtual node. Virtual nodes 306 may also have a distance since last regeneration value ("dr" in FIGS. 3B-3Q) that represents the combined weight of physical link(s) 304 from the last regeneration to the virtual node.

Additional virtual nodes may be added as virtual nodes 306 are traversed during the shortest regeneration path computation. For example, a virtual node may be added at the current node 302. A new virtual node 306 at the current node 302 may represent performing a regeneration at that particular node 302. A virtual node may also be added at one or more neighboring nodes 302. Virtual nodes 306 (both existing and added virtual nodes 306) may be traversed until all virtual nodes 306 have been visited. Some candidate virtual nodes may be block when a signal to the candidate virtual node would violate the maximum permitted weight (e.g., a combined weight of 6 or less since the last regeneration).

Adding virtual nodes 306 during the shortest regeneration path computation may increase the path computation time. Thus, conditions may be applied to identify candidate virtual nodes that could not correspond with the shortest minimum regeneration path. For example, condition A may represent when the distance value is greater than or equal to an existing virtual node at the same node 302, the distance since last regeneration for a candidate virtual node is greater than those of an existing virtual node at the same node 302, and the regeneration values of both nodes are the same. Condition B may represent when the distance value and regeneration value for a candidate virtual node are both greater than those of an existing virtual node at the same node 302. Condition C may represent when the regeneration value for a candidate virtual node is greater than and the distance since last regeneration value is greater than or equal to that of an existing virtual node at the same node 302. Condition D may represent when the regeneration value for a candidate virtual node is greater than 1+the regeneration value of the existing virtual node at the same node 302. If any of conditions A-D is detected, then the candidate virtual node may be blocked (e.g., disregarded or not created) because it could not correspond with a shorter regeneration path.

Calculating the shortest minimum regeneration path using virtual nodes is illustrated in FIGS. 3B-3Q. To begin in FIG. 3B, virtual node 306-1 is created at source node 302-1. The distance value for virtual node 306-1 representing the combined weight of physical links 304 from source node 302-1 is set to 0 because no physical links 304 have been traversed. The regeneration value representing the number of regenerations in the path is set to 0 because no regenerations have occurred from source node 302-1. The distance since regeneration value is also set to 0 because no physical links 304 have been traversed since the signal was generated at source node 302-1.

Path computation may begin at virtual node 306-1, the virtual node corresponding with source node 302-1. In FIG. 3B, candidate virtual nodes from virtual node 306-1 are considered before new virtual nodes are created. For example, candidate virtual nodes from virtual node 306-1 include a virtual node at node 302-1 and neighboring nodes 302-2 and 302-5. A candidate virtual node at source node 302-1 corresponds with performing a regeneration at node 302-1. This candidate virtual node is blocked because condition C is met (e.g., regeneration value for the candidate virtual node is greater than virtual node 306-1 and the distance since last regeneration value for the candidate virtual node is equal to virtual node 306-1). The remaining candidate virtual nodes correspond with neighboring nodes 302-2 and 302-5. The candidate virtual node at node 302-2 has a distance value of 4 (e.g., weight of virtual link 304 between 302-1 to 302-2), regeneration value of 0 (e.g., no regenerations in going to virtual node 302-2), and a distance since regeneration value of 4 (e.g., weight of virtual link 304 between 302-1 to 302-2). Virtual node 306-2 is created for this candidate virtual node. The candidate virtual node at node 302-5 has a distance value of 4 (e.g., weight of virtual link 304 between 302-1 to 302-5), regeneration value of 0

(e.g., no regenerations in going to virtual node 302-5), and a distance since regeneration value of 4 (e.g., weight of virtual link 304 between 302-1 to 302-5). Virtual node 306-3 is created for this candidate virtual node. Virtual node 306-1 is marked as visited.

Virtual node 306-2 is the next unvisited virtual node traversed because it is tied with virtual node 306-3 for the fewest regenerations and lowest distance value. In the case of the tie, either virtual node (e.g., the lowest node number) may be selected next. In FIG. 3C, candidate virtual nodes from virtual node 306-2 include a virtual node at node 302-2 and neighboring nodes 302-1, 302-3, and 302-4. A candidate virtual node at node 302-2 corresponds with performing a regeneration at node 302-2. Virtual node 306-4 is created for this candidate virtual node with a distance value of 4 (e.g., weight of link between nodes 302-1 to 302-2), regeneration value of 1 (e.g., one regeneration at node 302-2), and a distance since regeneration value of 0 (e.g., because of regeneration at node 302-2). Candidate virtual nodes at nodes 302-1 and 302-3 are blocked because a path from virtual node 306-2 to these nodes would exceed the maximum permitted weight of 6 without a regeneration (e.g., combined weight to node 302-1 is 8 and combined weight to node 302-3 is 10 without a regeneration). Virtual node 306-5 is created from the candidate virtual node at neighboring node 302-4. Virtual node 306-5 has a distance value of 6 (e.g., combined weight of links between nodes 302-1→302-2→302-4), regeneration value of 0 (e.g., no regenerations in path), and a distance since regeneration value of 6 (e.g., combined weight of links between nodes 302-1→302-2→302-4). Virtual node 306-2 is marked as visited.

Virtual node 306-3 is the next unvisited virtual node traversed because it has the fewest regenerations and lowest distance value. In FIG. 3D, candidate virtual nodes from virtual node 306-3 include a virtual node at node 302-5 and neighboring nodes 302-1, 302-4, and 302-6. A candidate virtual node at node 302-5 corresponds with performing a regeneration at node 302-5. Virtual node 306-5 is created for this candidate virtual node with a distance value of 4 (e.g., weight of link between nodes 302-1 to 302-5), regeneration value of 1 (e.g., one regeneration at node 302-5), and a distance since regeneration value of 0 (e.g., because of regeneration at node 302-5). Candidate virtual nodes at nodes 302-1, 302-4, and 302-6 are blocked because a path from virtual node 306-4 to these nodes would exceed the maximum permitted weight of 6 without a regeneration (e.g., combined weight to node 302-1 is 8, combined weight to node 302-4 is 7, and combined weight to node 302-6 is 7 without a regeneration). Virtual node 306-4 is marked as visited.

Virtual node 306-5 is the next unvisited virtual node traversed because it has the fewest regenerations and lowest distance value. In FIG. 3E, candidate virtual nodes from virtual node 306-5 include a virtual node at node 302-4 and neighboring nodes 302-2, 302-3, 302-5, and 302-6. A candidate virtual node at node 302-4 corresponds with performing a regeneration at node 302-4. Virtual node 306-7 is created for this candidate virtual node with a distance value of 6 (e.g., combined weight of links between nodes 302-1→302-2→302-4), regeneration value of 1 (e.g., one regeneration at node 302-4), and a distance since regeneration value of 0 (e.g., because of regeneration at node 302-4). Candidate virtual nodes at nodes 302-2, 302-3, 302-5, and 302-6 are blocked because a path from virtual node 306-5 to these nodes would exceed the maximum permitted weight of 6 without a regeneration (e.g., combined weight to node 302-2 is 8, combined weight to node 302-3 is 9, combined weight to node 302-5 is 9, and combined weight to node 302-6 is 8 without a regeneration). Virtual node 306-5 is marked as visited.

Virtual node 306-4 is the next unvisited virtual node traversed because it is tied for the fewest regenerations and lowest distance value. In FIG. 3F, candidate virtual nodes from virtual node 306-4 include a virtual node at node 302-2 and neighboring nodes 302-1, 302-3, and 302-4. A candidate virtual node at node 302-2 corresponds with performing a regeneration at node 302-2. This candidate virtual node is blocked because condition C is met. Candidate virtual node at node 302-4 is blocked because condition A is met (e.g., the virtual node would have the same distance value of 6, the same regeneration value of 1, but a higher distance since regeneration value of 2 as virtual node 306-5). Candidate virtual node at node 302-1 is blocked because condition B is met (e.g., the virtual node would have a higher distance value of 8, higher regeneration value of 1 as virtual node 306-1). The candidate virtual node at node 302-3 has a distance value of 10 (e.g., weight of links between nodes 302-1→302-2→302-3), regeneration value of 1 (e.g., one regeneration at virtual node 302-2), and a distance since regeneration value of 6 (e.g., weight of link between 302-2 to 302-3). Virtual node 306-8 is created for this candidate virtual node. Virtual node 306-4 is marked as visited.

Virtual node 306-6 is the next unvisited virtual node traversed because it has the fewest regenerations and lowest distance value. In FIG. 3G, candidate virtual nodes from virtual node 306-6 include a virtual node at node 302-5 and neighboring nodes 302-1, 302-4, and 302-6. A candidate virtual node at node 302-5 corresponds with performing a regeneration at node 302-5. This candidate virtual node is blocked because conditions C and D are met. Candidate virtual node at node 302-4 is blocked because condition A is met (e.g., the virtual node would have a higher distance value of 7, the same regeneration value of 1, and a higher distance since regeneration value of 3 as virtual node 306-7). Candidate virtual node at node 302-1 is blocked because conditions B and C are both met when compared to virtual node 306-1. The candidate virtual node at node 302-6 has a distance value of 7 (e.g., weight of links between nodes 302-1→302-5→302-6), regeneration value of 1 (e.g., one regeneration at virtual node 302-5), and a distance since regeneration value of 3 (e.g., weight of link between 302-5 to 302-6). Virtual node 306-9 is created for this candidate virtual node. Virtual node 306-6 is marked as visited.

Virtual node 306-7 is the next unvisited virtual node traversed because it has the fewest regenerations and lowest distance value. In FIG. 3H, candidate virtual nodes from virtual node 306-7 include a virtual node at node 302-4 and neighboring nodes 302-2, 302-3, 302-5, and 302-6. A candidate virtual node at node 302-4 corresponds with performing a regeneration at node 302-4. This candidate virtual node is blocked because conditions C and D are met. Candidate virtual node at node 302-2 is blocked because condition A is met (e.g., the virtual node would have a higher distance value of 8, the same regeneration value of 1, and a higher distance since regeneration value of 2 compared to virtual node 306-4). Candidate virtual node at node 302-5 is blocked because condition A is met compared to virtual node 306-6. The candidate virtual node at node 302-3 has a distance value of 9 (e.g., weight of links between nodes 302-1→302-2→302-4→302-3), a regeneration value of 1 (e.g., one regeneration at virtual node 302-4), and a distance since regeneration value of 3 (e.g., weight of link between 302-4 to 302-3). Virtual node 306-10 is created for this candidate virtual node. The candidate virtual node at node 302-6 has a distance value of 8 (e.g., weight of links between nodes 302-1→302-2→302-4→302-6), a regeneration value of 1 (e.g., one regeneration at virtual node 302-5), and a distance since regeneration value of 2 (e.g., weight of link between 302-4 to 302-6). Virtual node 306-11 is created for this candidate virtual node. Virtual node 306-7 is marked as visited. In some embodiments, virtual node 306-8 may also be marked as visited when virtual node 306-10 is added at node 302-3 because condition A is met in comparing virtual node 306-10 to 306-8.

Virtual node 306-9 is the next unvisited virtual node traversed because it has the fewest regenerations and lowest distance value. In FIG. 3I, candidate virtual nodes from virtual node 306-9 include a virtual node at node 302-6 and neighboring nodes 302-4, 302-5, and 302-7. A candidate virtual node at node 302-6 corresponds with performing a regeneration at node 302-6. Virtual node 306-12 is created for this candidate virtual node with a distance value of 7 (e.g., weight of link between nodes 302-1→302-5→302-6), regeneration value of 2 (e.g., a regeneration at nodes 302-5 and 302-6), and a distance since regeneration value of 0 (e.g., because of regeneration at node 302-6). Candidate virtual node at node 302-4 is blocked because condition A met compared to virtual node 306-7. Candidate virtual nodes at destination node 302-5 and 302-7 are blocked because a path from virtual node 306-9 to these nodes would exceed the maximum permitted weight of 6 without a regeneration (e.g., combined weight to node 302-7 is 8, combined weight to node 302-5 is 7 without a regeneration). Virtual node 306-9 is marked as visited.

Virtual node 306-11 is the next unvisited virtual node traversed because it has the fewest regenerations and lowest distance value. In FIG. 3J, candidate virtual nodes from virtual node 306-11 include a virtual node at node 302-6 and neighboring nodes 302-4, 302-5, and 302-7. A candidate virtual node at node 302-6 corresponds with performing a regeneration at node 302-6. Candidate virtual node at node 302-6 is blocked because condition C is met compared to virtual node 306-11. Candidate virtual nodes at nodes 302-4 and 302-5 are blocked because condition A is met compared to virtual nodes 306-7 and 306-6. The candidate virtual node at node 302-7 has a distance value of 12 (e.g., weight of links between nodes 302-1→302-2→302-4→302-6→302-7), a regeneration value of 1 (e.g., one regeneration at virtual node 302-4), and a distance since regeneration value of 6 (e.g., weight of link between 302-4→302-6→302-7). Virtual node 306-13 is created for this candidate virtual node. Virtual node 306-11 is marked as visited.

Virtual node 306-10 is the next unvisited virtual node traversed because it has the fewest regenerations and lowest distance value. In FIG. 3K, candidate virtual nodes from virtual node 306-10 include a virtual node at node 302-3 and neighboring nodes 302-2, 302-4, and 302-7. A candidate virtual node at node 302-3 corresponds with performing a regeneration at node 302-3. Virtual node 306-14 is created for this candidate virtual node with a distance value of 9 (e.g., weight of link between nodes 302-1→302-2→302-4→302-3), regeneration value of 2 (e.g., a regeneration at nodes 302-4 and 302-3), and a distance since regeneration value of 0 (e.g., because of regeneration at node 302-3). Candidate virtual nodes at node 302-2 and 302-7 are blocked because a path from virtual node 306-10 to these nodes would exceed the maximum permitted weight of 6 without a regeneration (e.g., combined weight to node 302-2 is 9 and combined weight to node 302-7 is 7 without a regeneration). Candidate virtual node at node 302-4 is blocked because condition A is met compared to virtual node 306-7. Virtual node 306-10 is marked as visited.

Virtual node 306-13 is the next unvisited virtual node traversed because it has the fewest regenerations and lowest distance value. In FIG. 3L, candidate virtual nodes from virtual node 306-13 include a virtual node at node 302-7 and neighboring nodes 302-3 and 302-6. A candidate virtual node at node 302-7 corresponds with performing a regeneration at node 302-7. Virtual node 306-15 is created for this candidate virtual node with a distance value of 12 (e.g., weight of link between nodes 302-1→302-2→302-4→302-6→302-7), regeneration value of 2 (e.g., a regeneration at nodes 302-4 and 302-7), and a distance since regeneration value of 0 (e.g., because of regeneration at node 302-7). Candidate virtual nodes at node 302-3 and 302—are blocked because a path from virtual node 306-13 to these nodes would exceed the maximum permitted weight of 6 without a regeneration (e.g., combined weight to node 302-3 is 10 and combined weight to node 302-6 is 10 without a regeneration). Virtual node 306-13 is marked as visited.

Virtual node 306-12 is the next unvisited virtual node traversed because it has the fewest regenerations and lowest distance value. In FIG. 3M, candidate virtual nodes from virtual node 306-12 include a virtual node at node 302-6 and neighboring nodes 302-4, 302-5, and 302-7. A candidate virtual node at node 302-6 corresponds with performing a regeneration at node 302-6. This candidate virtual node is blocked because conditions C and D are met. Candidate virtual nodes at nodes 302-4 and 302-5 are blocked because conditions B and C are met compared to virtual nodes 306-6 and 306-7. The candidate virtual node at node 302-7 has a distance value of 11 (e.g., weight of links between nodes 302-1→302-5→302-6→302-7), regeneration value of 2 (e.g., a regeneration at virtual node 302-5 and virtual node 302-6), and a distance since regeneration value of 4 (e.g., weight of link between 302-6→302-7). Virtual node 306-16 is created for this candidate virtual node. Virtual node 306-12 is marked as visited.

Virtual node 306-14 is the next unvisited virtual node traversed because it has the fewest regenerations and lowest distance value. In FIG. 3N, candidate virtual nodes from virtual node 306-14 include a virtual node at node 302-3 and neighboring nodes 302-2, 302-4, and 302-7. A candidate virtual node at node 302-3 corresponds with performing a regeneration at node 302-3. This candidate virtual node is blocked because conditions C and D are met. Candidate virtual node at node 302-7 is blocked because conditions A and B are met compared to virtual nodes 306-13 and 306-15. Candidate virtual node at nodes 302-2 and 302-4 are blocked because condition B is met compared to virtual nodes 306-4, 306-7. Virtual node 306-14 is marked as visited.

Virtual node 306-16 is the next unvisited virtual node traversed because it has the fewest regenerations and lowest distance value. In FIG. 3O, candidate virtual nodes from virtual node 306-16 include a virtual node at node 302-7 and neighboring nodes 302-3 and 302-6. A candidate virtual node at node 302-7 corresponds with performing a regeneration at node 302-7. This candidate virtual node is blocked because conditions B and D are met. Candidate virtual nodes at node 302-3 and 302-6 are blocked because a path from virtual node 306-16 to these nodes would exceed the maximum permitted weight of 6 without a regeneration (e.g., combined weight to node 302-3 is 8 and combined weight to node 302-6 is 8 without a regeneration). Virtual node 306-16 is marked as visited.

Virtual node 306-15 is the next and last unvisited virtual node traversed. In FIG. 3P, candidate virtual nodes from virtual node 306-15 include a virtual node at node 302-7 and neighboring nodes 302-3 and 302-6. A candidate virtual node at node 302-7 corresponds with performing a regeneration at node 302-7. This candidate virtual node is blocked because conditions B and D are met. Candidate virtual nodes at node 302-3 and 302-6 are blocked because conditions A, B, and C are met compared to the virtual nodes 306 at these nodes. Virtual node 306-15 is marked as visited.

After all virtual nodes in network 300 are visited, the shortest minimum regeneration path from source node 302-1 to destination node 302-7 may be determined from the virtual nodes at 302-7. Virtual node 306-13 has regeneration value of 1, less than virtual nodes 306-15 and 306-16. Thus, the path through virtual node 306-13 represents the shortest minimum regeneration path to destination node 302-7 in network 300. Shortest path 320 (e.g., the path between nodes 302-1→302-2→302-4→302-6→302-7) in FIG. 3Q illustrates the shortest minimum regeneration path. Determining the nodes in the shortest path may be tracked in any suitable manner. For example, the previous node from which a virtual link was created may be tracked during computation of the shortest path so that particular virtual nodes in the path may be determined by working back from the destination node to the source node.

While FIGS. 3A-Q illustrate an example shortest path algorithm operating in accordance with the present invention, the order and implementation described above are not intended to be limiting. The implementation above represents an implementation with Dijkstra's shortest path algorithm. However, the present invention may be implemented with any other shortest path algorithm, including those discussed above with respect to FIG. 2.

As described above, network 300 may include a control system for determining the shortest path with a constraint. Similar to control system 200 in FIG. 2, executable instructions (i.e., executable code) may be executed by a processor to implement one or more features of the present invention.

Figure 4:
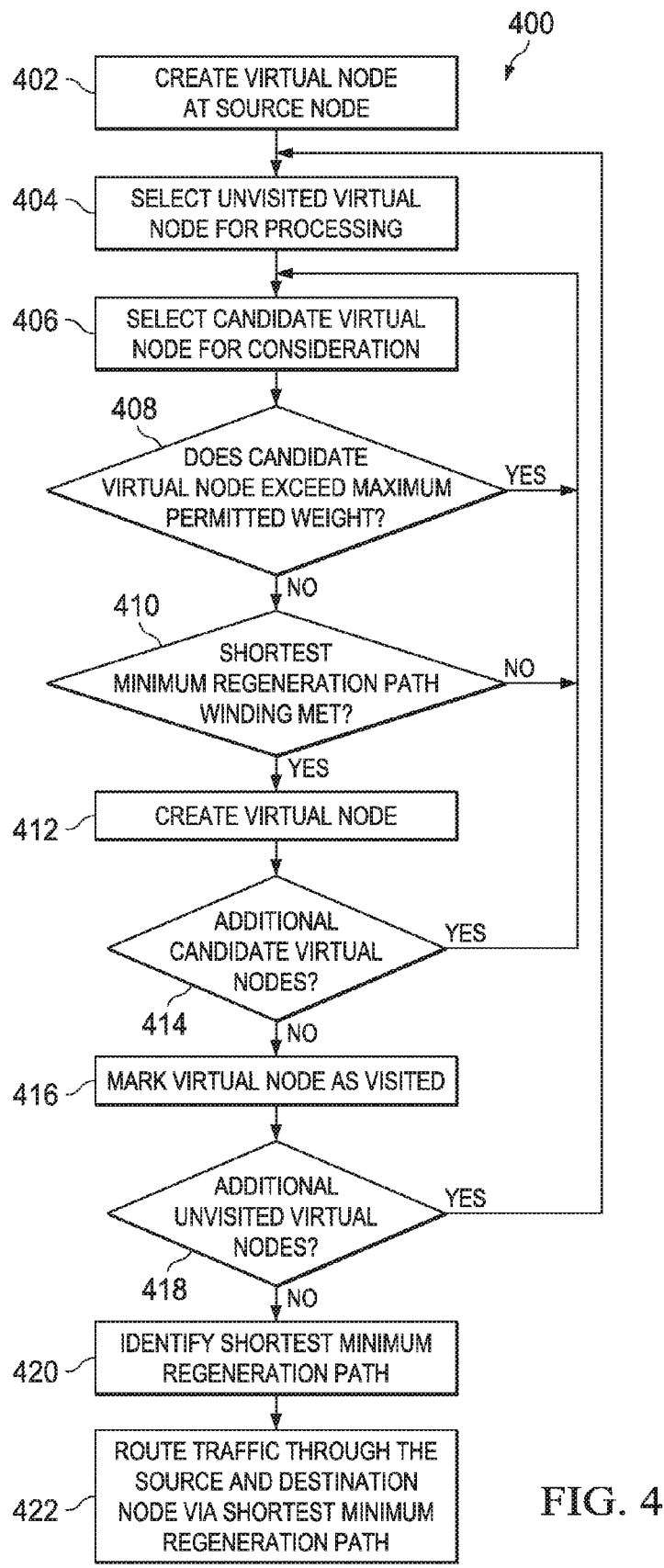
FIG. 4 is a flow chart of a method for determining the shortest path with a constraint in an optical network.

FIG. 4 is a flow chart of a method for determining the shortest minimum regeneration path in an optical network. Method 400 may be performed using one or more of the elements of control system 200 described in FIG. 2, including path computation engine 202. It is noted that certain operations described in method 400 may be optional or may be rearranged in different embodiments.

Method 400 may begin at step 402, by creating a virtual node at the source node in the network. As described above, each virtual node may include values used in the path computation. The distance value, regeneration value, and distance since last regeneration value for the virtual node may be set to 0 because no physical links have been traversed since the signal was generated at the source node. The virtual node and values associated with the virtual node may be stored in memory media at the source node, or memory media at another element in or communicatively coupled to the network.

At step 404, an unvisited virtual node is selected for processing. In some embodiments, the virtual node selected may be the unvisited virtual node in the network with the lowest regeneration value (e.g., the fewest regenerations) and the lowest distance value (e.g., lowest combined weight of links traversed to the virtual node from the source node).

At step 406, a candidate virtual node from the selected virtual node is considered. A candidate virtual node may include a new virtual node at the current node of the virtual node selected at step 404. A new virtual node at the current node represents performing a regeneration at that particular node. In some embodiments, a node may lack the hardware, software, and/or resources to perform a regeneration, in which case a new virtual node at the current node may be blocked. Candidate virtual nodes may also include adding a virtual node at a neighboring node (e.g., a node coupled to the current node by a physical link).

Next, a determination may be made at step 408 as to whether the candidate virtual node would violate the maximum permitted weight. For example, distance of the selected candidate virtual node may checked to determine if a path to the candidate virtual node would violate the maximum permitted weight (e.g., a maximum combined weight since the last regeneration). If the candidate virtual node would violate the maximum permitted weight, then method 400 may proceed back to step 406 because the candidate virtual node cannot be part of the shortest minimum regeneration path. Otherwise, method may proceed to step 410.

Next, a determination may be made at step 410 as to whether shortest minimum regeneration path conditions are met. For example, the candidate virtual node may be checked to determine if its distance value is greater than or equal to an existing virtual node at the same node, the distance since last regeneration is greater than those of an existing virtual node at the same node, and the regeneration values of both nodes are the same. The candidate virtual node may also be checked to determine if its distance value and regeneration value for are both greater than those of an existing virtual node at the same node. The candidate virtual node may also be checked to determine if its regeneration value is greater than and the distance since last regeneration value is greater than or equal to that of an existing virtual node at the same node. The candidate virtual node may also be checked to determine if its regeneration value is greater than 1+the regeneration value of the existing virtual node at the same node. If any of the above conditions exist, then method 400 may proceed back to step 406 because the candidate virtual node cannot be part of the shortest minimum regeneration path.

However, when none of the conditions in step 410 are identified, then method 400 may proceed to step 412. In step 412, a virtual node is created from the candidate virtual node. The distance value, regeneration value, and distance since last regeneration value for the virtual node may be set to the appropriate values based on the physical links that have been traversed and the regenerations that have occurred. For example, if a regeneration is performed at the virtual node, then the regeneration value may be incremented from the regeneration value at the previous virtual node. The distance value may be increased by the weight of the physical link traveled from the virtual node. The distance since last regeneration value may be reset to 0 if a regeneration is performed at the virtual node or otherwise increased by the weight of the physical link traveled from the virtual node. In some embodiments, other virtual nodes at the same node may be checked against the newly created virtual with the same conditions enumerated in step 410. If other virtual node could not be not be part of the shortest minimum regeneration path based on the new virtual node (e.g., a condition in step 410 is met), then the other virtual node may be marked as visited so it is not processed.

Next, a determination may be made at step 414 as to whether there are additional candidate virtual nodes for consideration. If there are additional candidate virtual nodes for consideration, then method 400 may proceed back to step 406 in which a new candidate virtual node is selected for processing. If, however, there are no additional candidate virtual nodes for consideration, then method 400 may proceed to step 416.

At step 416, the virtual node being processed may be marked as visited.

Next, a determination may be made at step 418 as to whether there are additional unvisited virtual nodes for consideration. If there are additional unvisited virtual nodes for consideration, then method 400 may proceed back to step 404 in which the next unvisited virtual node is selected for processing. If, however, there are no additional unvisited virtual nodes for consideration, then method 400 may proceed to step 420.

At step 420, the shortest minimum regeneration path is identified. In some embodiments, the shortest path may be identified by the virtual links between the virtual nodes. For example, the virtual node at the destination node with the lowest regeneration value and lowest distance value may correspond with the shortest minimum regeneration path. Thus, the virtual links between the virtual nodes may be traversed back to the source node to identify the shortest minimum regeneration path. The shortest minimum regeneration path may be through the network nodes corresponding with the path of virtual nodes. The path may represent the shortest path between a source node and a destination node with the fewest regenerations.

At step 422, the traffic between the source node and destination node is routed via the shortest minimum regeneration path identified at step 420. The identified path may be used for communication between the source and destination nodes. For example, the network control system may provision a communication channel between the source and destination node along the identified path such that traffic between these nodes is directed along the various nodes in the path.

The above disclosed subject matter is to be considered illustrative, and not restrictive, and the appended claims are intended to cover all such modifications, enhancements, and other embodiments which fall within the true spirit and scope of the present disclosure. For example, if all shortest minimum regeneration paths are desired, then one or more of the conditions in step 410 may be modified. To illustrate, the candidate virtual node may be checked to determine if its distance value is greater than (e.g., as opposed to greater than or equal to) an existing virtual node at the same node, the distance since last regeneration is greater than those of an existing virtual node at the same node, and the regeneration values of both nodes are the same. As another example, the candidate virtual node may also be checked to determine if its regeneration value is greater than and the distance since last regeneration value is greater than (e.g., as opposed to greater than or equal to) that of an existing virtual node at the same node. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for determining a shortest minimum regeneration path in an optical network, the method comprising:
    creating a virtual node at a source node, the source node communicatively coupled to a destination node through a plurality of nodes and links;
    traversing the virtual nodes, wherein traversing the virtual nodes comprises:
        selecting an unvisited virtual node at a node;
        identifying a candidate virtual node from the unvisited virtual node, the candidate virtual node representing a new virtual node at the node and a neighboring node;
        determining whether the candidate virtual node exceeds a maximum permitted weight;
        determining whether the candidate virtual node violates a shortest minimum regeneration path condition, the shortest minimum regeneration path condition identifying virtual nodes that could not be part of the shortest minimum regeneration path;
        creating the new virtual node from the candidate virtual node if the candidate virtual node does not exceed the maximum permitted weight and if the candidate virtual node does not violate the shortest minimum regeneration path condition; and
        marking the unvisited virtual node as visited; and
    identifying a shortest minimum regeneration path between the source node and the destination node from the virtual nodes.

2. The method of claim 1, wherein creating the new virtual node comprises:
    setting a distance value for the new virtual node to a combined weight of links in a path from the source node to the new virtual node;
    setting a regeneration value for the new virtual node to a total number of regenerations in the path to the new virtual node;
    setting a distance since last regeneration value for the new virtual node to a combined weight of links between the new virtual node and a prior virtual node at which a regeneration occurred.

3. The method of claim 1, wherein the candidate virtual node exceeds a maximum permitted weight if a combined weight of links between the new virtual node and a prior virtual node at which a regeneration occurred exceeds a predetermined maximum permitted weight.

4. The method of claim 1, wherein determining whether the candidate virtual node violates the shortest minimum regeneration path condition comprises comparing one of a distance value, a regeneration value, and a distance since last regeneration value to an existing virtual node at the node.

5. The method of claim 4, wherein the virtual node violates the shortest minimum regeneration condition if the distance value is greater than or equal to the existing virtual node, the distance since last regeneration for the candidate virtual node is greater than the existing virtual node, and the regeneration value for the candidate virtual node is equal to the existing virtual node.

6. The method of claim 4, wherein the virtual node violates the shortest minimum regeneration condition if the distance value is greater than the existing virtual node and the regeneration value for the candidate virtual node is greater than the existing virtual node.

7. The method of claim 4, wherein the virtual node violates the shortest minimum regeneration condition if the regeneration value is great than the existing virtual node, and the distance since last regeneration value is greater than or equal to the existing virtual node.

8. The method of claim 4, wherein the virtual node violates the shortest minimum regeneration condition if the regeneration value of the candidate virtual node is greater than one plus the regeneration value of the existing virtual node.

9. The method of claim 1, wherein identifying the shortest minimum regeneration path comprises:

selecting a virtual node at the destination node with a lowest regeneration value and a lowest distance value; and following the links from the virtual node with the lowest regeneration value and the lowest distance value to the source node.

10. The method of claim 1, wherein selecting an unvisited virtual node from the virtual nodes comprises selecting a virtual node with a lowest regeneration value and distance value.

11. A control system for identifying the shortest minimum regeneration path, the control system comprising a processor having access to memory media storing instructions executable by the processor to:

create a virtual node at a source node, the source node communicatively coupled to a destination node through a plurality of nodes and links;

select an unvisited virtual node at a node;

identify a candidate virtual node from the unvisited virtual node, the candidate virtual node representing a new virtual node at the node and a neighboring node;

determine whether the candidate virtual node exceeds a maximum permitted weight;

determine whether the candidate virtual node violates a shortest minimum regeneration path condition, the shortest minimum regeneration path condition identifying virtual nodes that could not be part of the shortest minimum regeneration path;

create the new virtual node from the candidate virtual node if the candidate virtual node does not exceed the maximum permitted weight and if the candidate virtual node does not violate the shortest minimum regeneration path condition;

mark the unvisited virtual node as visited; and identify a shortest minimum regeneration path between the source node and the destination node from the virtual nodes.

12. The control system of claim 11, wherein the memory media further comprises instructions to:

set a distance value for the new virtual node to a combined weight of links in a path from the source node to the new virtual node;

set a regeneration value for the new virtual node to a total number of regenerations in the path to the new virtual node;

set a distance since last regeneration value for the new virtual node to a combined weight of links between the new virtual node and a prior virtual node at which a regeneration occurred.

13. The control system of claim 11, wherein the candidate virtual node exceeds a maximum permitted weight if a combined weight of links between the new virtual node and a prior virtual node at which a regeneration occurred exceeds a predetermined maximum permitted weight.

14. The control system of claim 11, wherein determining whether the candidate virtual node violates the shortest minimum regeneration path condition comprises comparing one of a distance value, a regeneration value, and a distance since last regeneration value to an existing virtual node at the node.

15. The control system of claim 14, wherein the virtual node violates the shortest minimum regeneration condition if the distance value is greater than or equal to the existing virtual node, the distance since last regeneration for the candidate virtual node is greater than the existing virtual node, and the regeneration value for the candidate virtual node is equal to the existing virtual node.

16. The control system of claim 14, wherein the virtual node violates the shortest minimum regeneration condition if the distance value is greater than the existing virtual node and the regeneration value for the candidate virtual node is greater than the existing virtual node.

17. The control system of claim 14, wherein the virtual node violates the shortest minimum regeneration condition if the regeneration value is great than the existing virtual node, and the distance since last regeneration value is greater than or equal to the existing virtual node.

18. The control system of claim 14, wherein the virtual node violates the shortest minimum regeneration condition if the regeneration value of the candidate virtual node is greater than one plus the regeneration value of the existing virtual node.

19. The control system of claim 11, wherein identifying the shortest minimum regeneration path comprises:

selecting a virtual node at the destination node with a lowest regeneration value and a lowest distance value; and following the links from the virtual node with the lowest regeneration value and the lowest distance value to the source node.

20. The control system of claim 11, wherein selecting an unvisited virtual node from the virtual nodes comprises selecting a virtual node with a lowest regeneration value and distance value.

* * * * *